United States Patent
Takizawa

(10) Patent No.: US 8,040,898 B2
(45) Date of Patent: Oct. 18, 2011

(54) WIRELESS TERMINAL, ACCESS POINT, SYSTEM PROVIDED WITH THE SAME, AND WIRELESS COMMUNICATION METHOD

(75) Inventor: Masaaki Takizawa, Fukushima (JP)

(73) Assignee: Hitachi, Ltd., Tokyo (JP)

( * ) Notice: Subject to any disclaimer, the term of this patent is extended or adjusted under 35 U.S.C. 154(b) by 1031 days.

(21) Appl. No.: 11/850,099

(22) Filed: Sep. 5, 2007

(65) Prior Publication Data

US 2008/0123606 A1 May 29, 2008

(30) Foreign Application Priority Data

Nov. 29, 2006 (JP) ................................. 2006-321086

(51) Int. Cl.
*H04W 4/00* (2009.01)
*H04L 12/28* (2006.01)

(52) U.S. Cl. ................... 370/395.42; 370/328

(58) Field of Classification Search ............. 370/395.21, 370/395.43, 329, 335, 328, 445, 447, 451, 370/455, 461, 448

See application file for complete search history.

(56) References Cited

U.S. PATENT DOCUMENTS

| | | | |
|---|---|---|---|
| 7,616,616 B2 * | 11/2009 | Amann et al. | 370/338 |
| 7,864,674 B2 * | 1/2011 | Benveniste | 370/230 |
| 2006/0193274 A1 * | 8/2006 | Yamagata | 370/310 |
| 2007/0047570 A1 * | 3/2007 | Benveniste | 370/448 |

FOREIGN PATENT DOCUMENTS

JP 2006-166114 6/2006

OTHER PUBLICATIONS

"Wireless LAN Medium Access Control (MAC) and Physical Layer (PHY) Specifications" Institute of Electrical and Electronics Engineers, ANSI/IEEE Std 802.11, 1999 Edition.

* cited by examiner

*Primary Examiner* — Hanh Nguyen
(74) *Attorney, Agent, or Firm* — Antonelli, Terry, Stout & Kraus, LLP.

(57) ABSTRACT

A wireless LAN communications system with high transmission efficiency is provided. When a first wireless terminal normally receives a Data1 signal from an access point, the wireless terminal transmits an ACK signal. In the case where the wireless terminal has transmission data, the client transmits a Data2 signal to the access point after an SIFS interval. Meanwhile, when the access point or a second wireless terminal receives the ACK signal from the first wireless terminal, the second client waits a (DIFS+random number) interval, in accordance with the IEEE 802.11 standard. As a result, the first wireless terminal is able to transmit the Data2 signal with priority, without interference from signals from other devices.

2 Claims, 19 Drawing Sheets

Wireless communication system of the first embodiment

WIRELESS TERMINAL OF THE SECOND EMBODIMENT

Wireless communication system of the third embodiment

WIRELESS TERMINAL OF THE THIRD EMBODIMENT

AP OF THE SEVENTH EMBODIMENT

FIG.19
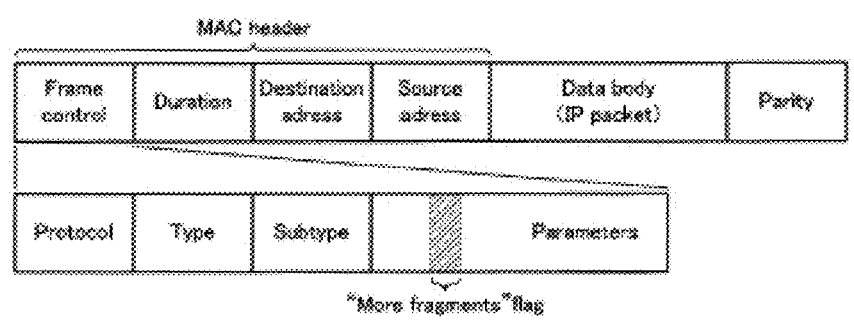
FIG.20 - PRIOR ART
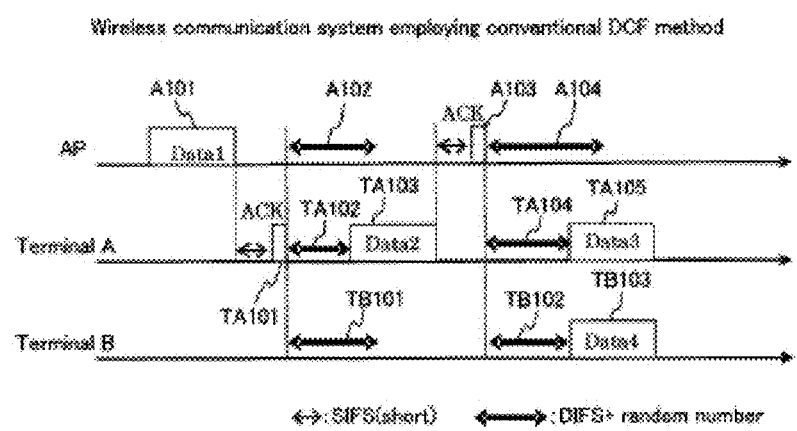

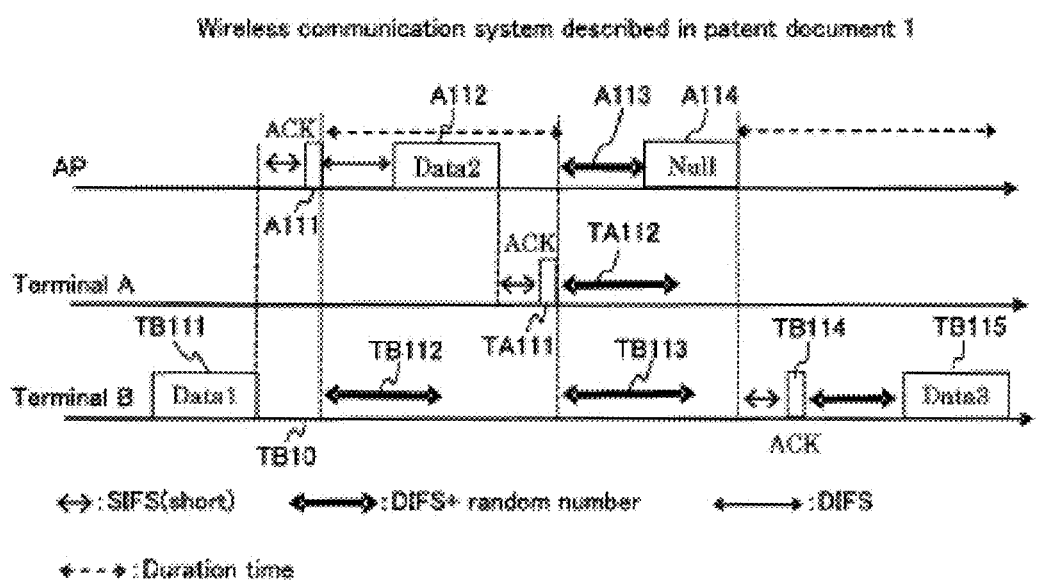
FIG.21 - PRIOR ART

WIRELESS TERMINAL, ACCESS POINT, SYSTEM PROVIDED WITH THE SAME, AND WIRELESS COMMUNICATION METHOD

BACKGROUND OF THE INVENTION

1. Field of the Invention

The present invention relates to wireless terminals for conducting wireless communications in a wireless LAN (Local Area Network), access points for communicating wirelessly to these wireless terminals, as well as wireless communication systems and methods provided therewith.

2. Description of the Related Art

In recent years, wireless LANs have become widespread as one type of computer communications network, and are now used with great popularity in offices, homes, and public places (for example, train stations, airports, and fast food restaurants). As is commonly known to those skilled in the art, wireless communication in such a wireless LAN is conducted between an access point (hereinafter, AP) and wireless terminals.

In this wireless LAN, a plurality of wireless terminals and APs communicate in a single shared space. Two or more devices among the plurality of wireless terminals and APs cannot send wireless signals simultaneously. Therefore, it is necessary to adjust transmitting timing for the wireless signals.

A method for adjusting the transmitting timing for wireless signals is stipulated in detail in the IEEE (Institute of Electrical and Electronics Engineers) 802.11 standard ["Wireless LAN Medium Access Control (MAC) and Physical Layer (PHY) Specifications" ANSI/IEEE Std 802.11, 1999 Edition.] in the non-patent document below.

In the IEEE 802.11 standard, a method referred to as the DCF (Distributed Coordination Function) is stipulated as a method for adjusting the transmitting timing for wireless signals.

This DCF method will now be simply described with reference to FIG. 20. The following description takes as an example the case wherein wireless communication between one AP and two wireless terminals is conducted using a single space. In addition, for the sake of brevity in the following description, transmission signals, including, for example, data signals and encoded voice signals, will be collectively referred to as data.

First, an AP transmits a Data1 signal addressed to a wireless terminal A (A101). Upon receiving a Data1 signal normally, the wireless terminal A waits a minimum period known as the SIFS (Short Inter Frame Space), and returns an ACK signal addressed to the AP (TA101). When the communication of the above ACK signal is completed, each device, in order to obtain next transmission rights, waits respective DIFS (Distributed Inter Frame Space, DIFS>SIFS)+random number (positive or zero) intervals (A102, TA102, TB101). In addition, during these respective intervals, each device respectively confirms that a wireless signal from other devices is not present.

For the purposes of this example, it is supposed that the random number of the wireless terminal A is the smallest, and therefore the wireless terminal A completes its waiting time first and obtains transmission rights. In so doing, the wireless terminal A transmits a Data2 signal addressed to the AP (TA103). Since the above-described random numbers of the AP and the wireless terminal B, respectively, were larger than that of the wireless terminal A, the wireless signal from the wireless terminal A is received by the AP and the wireless terminal B before their respective waiting time end. At this point, the AP and the wireless terminal B immediately halt waiting time receive said wireless signal, and each device subsequently determines, respectively, whether or not the wireless signal is addressed to itself.

The AP, upon receiving a Data2 signal normally, confirms that the signal is addressed to itself, and after subsequently waiting an SIFS interval as per the above-described, returns an ACK signal addressed to the wireless terminal A (A103), and notifies that a Data2 signal was received normally (S105). In a manner equivalent to the above-described case, when the transmission of this ACK signal is completed, the AP and the wireless terminals A and B again respectively wait (DIFS+random number) intervals (A104, TA104, TB102), and detect whether or not a receiving wireless signal is present during the waiting time. The device whose waiting time ends first, obtains transmission rights for the next transmission and transmits data.

Supposing hypothetically that the random numbers for the wireless terminal A accords with that for the wireless terminal B by chance, the wireless terminals A and B will respectively transmit a Data3 signal and a Data4 signal addressed to the AP simultaneously (TA105, TB103). As a result, these wireless signals will interfere with each other, and the AP will be unable to receive either wireless signal.

In order to avoid such interference, the IEEE 802.11 standard stipulates that a parameter known as the duration time, which reserves the transmission time for the data transmitted by wireless from the current time, is to be included in the IP packet header of the transmitted data.

A specific method for avoiding the above-described interference by utilizing this duration time is described in patent document 1 (Japanese Unexamined Patent Application Publication No. 2006-166114).

The method described in the above patent publication will now be simply described with reference to FIG. 21. For the sake of simplicity the following description also takes as an example the case wherein wireless communication is conducted between an AP and wireless terminals A and B using a single space.

First, the wireless terminal B transmits a Data1 signal addressed to the AP (TB111). The AP, upon receiving a Data1 signal normally, waits an SIFS interval, and subsequently returns an ACK signal (A111). The IEEE 802.11 standard at this time, after the ACK signal return, stipulates that the duration time included in the ACK signal should be set to 0 so as not to reserve transmission time for the next wireless signal, so that both the AP and the wireless terminals can equally transmit the wireless signal. By contrast, in the method described in patent document 1 (JP-A-2006-166114), this duration time is to be set to a value corresponding to, for example, the transmission time for the expected transmission of a subsequent Data2 signal and the transmission time for the ACK signal in response thereto. In other words, the AP reserves the transmission of the next wireless signal.

Upon receiving an ACK signal having a non-zero duration time, the wireless terminal A, in accordance with the IEEE 802.11 standard, configures the above-described non-zero duration time in its built-in clock (referred to hereinafter as NAV). Until the NAV value, which decreases with passing time, reaches zero, the wireless terminal A will not transmit data. However, the wireless terminal B to which the ACK is addressed, in accordance with the IEEE 802.11 standard, does not configure its NAV with the above-described duration time. Consequently, only the AP and the wireless terminal B become able to transmit, and after the waiting time, one of the two devices obtains transmission rights. Then, the general-purpose wireless terminal B waits a (DIFS+random number)

interval (TB112), while the AP waits, for example, a DIFS interval. For this reason, the probability that the AP will obtain transmission rights is increased. It is supposed at this point that the AP obtains transmission rights and subsequently transmits a Data2 signal addressed to the wireless terminal-A (A112).

The wireless terminal A, upon receiving a Data2 signal normally, waits an SIFS interval, and subsequently returns an ACK signal and notifies the AP that a Data2 signal was received normally (TA111). When the transmission of this ACK is completed, the AP and the wireless terminals A and B, in accordance with a normal transmission rights acquisition method, respectively wait (DIFS+random number) intervals (A113, TA112, TB113.)

The case wherein the AP obtains the rights for the next transmission, and furthermore wherein the AP grants priority transmission rights to the wireless terminal B, will now be described. The AP transmits invalid data (hereinafter referred to as null data) addressed to the wireless terminal B (S118). This null data may include a duration time corresponding to the transmission time for the wireless terminal B to transmit the next expected ACK signal and a Data3 signal, or a duration time corresponding to the above transmission time plus the transmission time for the AP to return the corresponding Data3 signal with an ACK signal.

The terminals other than the wireless terminal B, such as the wireless terminal A, respectively configure their NAVs with a duration time like the above-described, and do not transmit data until the NAV value reaches zero. If the AP itself also configures its NAV with the above-described duration time, in the same way the AP do not transmit data until its NAV reaches zero.

On the other hand, the wireless terminal B, upon receiving Null data like the above-described, waits an SIFS interval, and subsequently returns an ACK signal notifying the AP that Null data was received normally (S118). Additionally, in the case where the wireless terminal B has transmission data, the wireless terminal B waits a (DIFS+random number) interval, and no wireless signals are received from other devices, transmits a Data3 signal (S119). In this case, since the other devices, such as the wireless terminal A and the AP, do not transmit data during the duration time, the possibility that the wireless terminal B will be able to transmit the next signal is high. In other words, as a result of the control process wherein the AP transmits null data including a non-zero duration time, the general purpose wireless terminal B gains priority transmission rights and interference is prevented.

Non-patent document 1: "Wireless LAN Medium Control (MAC) and Physical Layer (PHY) Specifications" ANSI/IEEE Std 802.11, 1999 Edition Patent document 1: Japanese Unexamined Patent Application Publication No. 2006-166114

SUMMARY OF THE INVENTION

As described in the foregoing, since in a wireless LAN two or more devices among a plurality of wireless terminals and APs cannot simultaneously transmit wireless signals, it is desirable to improve the transmission efficiency. However, in the DCF method stipulated in the IEEE 802.11 standard, it is necessary to wait at least a (DIFS+random number) interval in order to obtain transmission rights. This transmission method is not necessarily an efficient one. In addition, also in the method described in patent document 1 (JP-A-2006-166144), although a wireless terminal may be granted priority transmission rights by the AP, if that wireless terminal does not have transmitting data ready for transmission, time is needlessly wasted. For this reason, it cannot be said that transmission efficiency is good.

In response to the demand for a wireless LAN, it is an object of the present invention to provide a wireless communication system and wireless communication method having wireless terminals and access points wherein interference is inhibited and transmission efficiency is improved.

In order to settle the above-described problem, a wireless terminal in accordance with the present invention is provided with a transmission unit for transmitting wireless signals, and a receiving unit for receiving wireless signals. In the wireless terminal which wirelessly communicates with an access point on a wireless LAN, a communication control unit is provided which, when the receiving unit receives from the access point the wireless signal addressed to the terminal itself, if the wireless terminal has transmission data, gives priority to the wireless terminal to transmit a wireless signal before any other wireless terminals connected to the access point, so that a wireless signal containing the transmission data is transmitted from the transmission unit.

The above-described communication control unit may also be configured such that transmission data is transmitted in the following way. First, the receiving unit receives from the access point a wireless signal addressed to the terminal itself; and after transmitting, from the transmission unit, an ACK signal notifying the access point that a wireless signal was received normally, in cases where the wireless terminal has transmission data, the wireless terminal waits a predetermined interval that is less than a DIFS (Distributed Coordination Function) interval, and subsequently transmits a wireless signal containing the above-described transmission data, from the transmission unit.

In addition, the above-described communication control unit may also be configured such that transmission data is transmitted in the following way. First, in cases where the receiving unit receives normally, from the access point, a wireless signal addressed to the terminal itself, and the wireless terminal does not have transmission data to be transmitted to the access point, the wireless terminal transmits via the transmission unit an ACK signal notifying the access point that a wireless signal was received normally; if the wireless terminal has transmission data to be transmitted to the access point, after the receiving unit receives from the access point the wireless signal, the wireless terminal waits a predetermined interval that is less than the DIFS interval, and subsequently transmits a wireless signal containing the above-described transmission data from the transmission unit.

In addition, in order to settle the above-described problem, an access point in accordance with the present invention is provided with a transmission unit for transmitting wireless signals, and a receiving unit for receiving wireless signals; at an access point which wirelessly communicates with a plurality of wireless terminals on a wireless LAN, in cases where the access point has transmission data to be transmitted to a wireless terminal among the plurality of wireless terminals, after transmission of a signal containing the transmission data to a wireless terminal, a communication control unit incorporates into the signal including the transmission data information about a duration time that is longer than the time from the transmission of a signal including the transmission data until the single wireless terminal commences transmission of a signal including a transmission data, and causes the signal to be transmitted from the transmission unit.

A wireless communication system to settle the above-described problem is provided with the above-described access point and the above-described wireless terminal.

In addition, in order to settle the above-described problem, in accordance with the present invention, in a wireless communication method for wirelessly communicating between an access point and a wireless terminal in a wireless LAN, when the wireless signal addressed to the terminal itself is received from the access point, in cases where transmission data exists, priority is given to transmission rights to transmit a wireless signal before wireless signals from other wireless terminals connected to the access point, and the wireless signal containing the transmission data is transmitted.

In addition, in a wireless communication method in accordance with the present invention, in a wireless communication method for wirelessly communicating between an access point and a wireless terminal in a wireless LAN, wherein if the access point has transmission data to be transmitted to a single wireless terminal among a plurality of wireless terminals, the access point incorporates into the signal including the transmission data information about a duration time that is longer than the time from the transmission of a signal including the transmission data until the single wireless terminal commences transmission of a signal including a transmission data, and causes the signal to be transmitted from the transmission unit.

As a result of the present invention, in cases where the wireless terminal receives from the access point a data signal addressed to the terminal itself, by taking advantage of the fact that this wireless terminal is the only one among the plurality of wireless terminals connected to the access point, this wireless terminal is granted priority to transmit a data signal. For example, by setting the waiting time to a time less than that of the DIFS interval and subsequently causing a data signal to be transmitted, transmission efficiency is improved while suppressing interference.

BRIEF DESCRIPTION OF THE DRAWINGS

FIG. 19 is a diagram illustrating a configuration of a MAC frame;

FIG. 20 is a timing chart showing the operation of a wireless communication system employing the conventional DCF method in accordance; and FIG. 21 is a timing chart showing the operation of a wireless communication system in accordance with patent document 1 (JP-A-2006-166114).

DETAILED DESCRIPTION OF THE INVENTION

Hereinafter, the various embodiments of a wireless communication system in accordance with the present invention will be described in detail with reference to the accompanying drawings.

First Embodiment

First, the first embodiment of the wireless communication system in accordance with the present invention will be described with reference to FIGS. 1-6.

Figure 1:
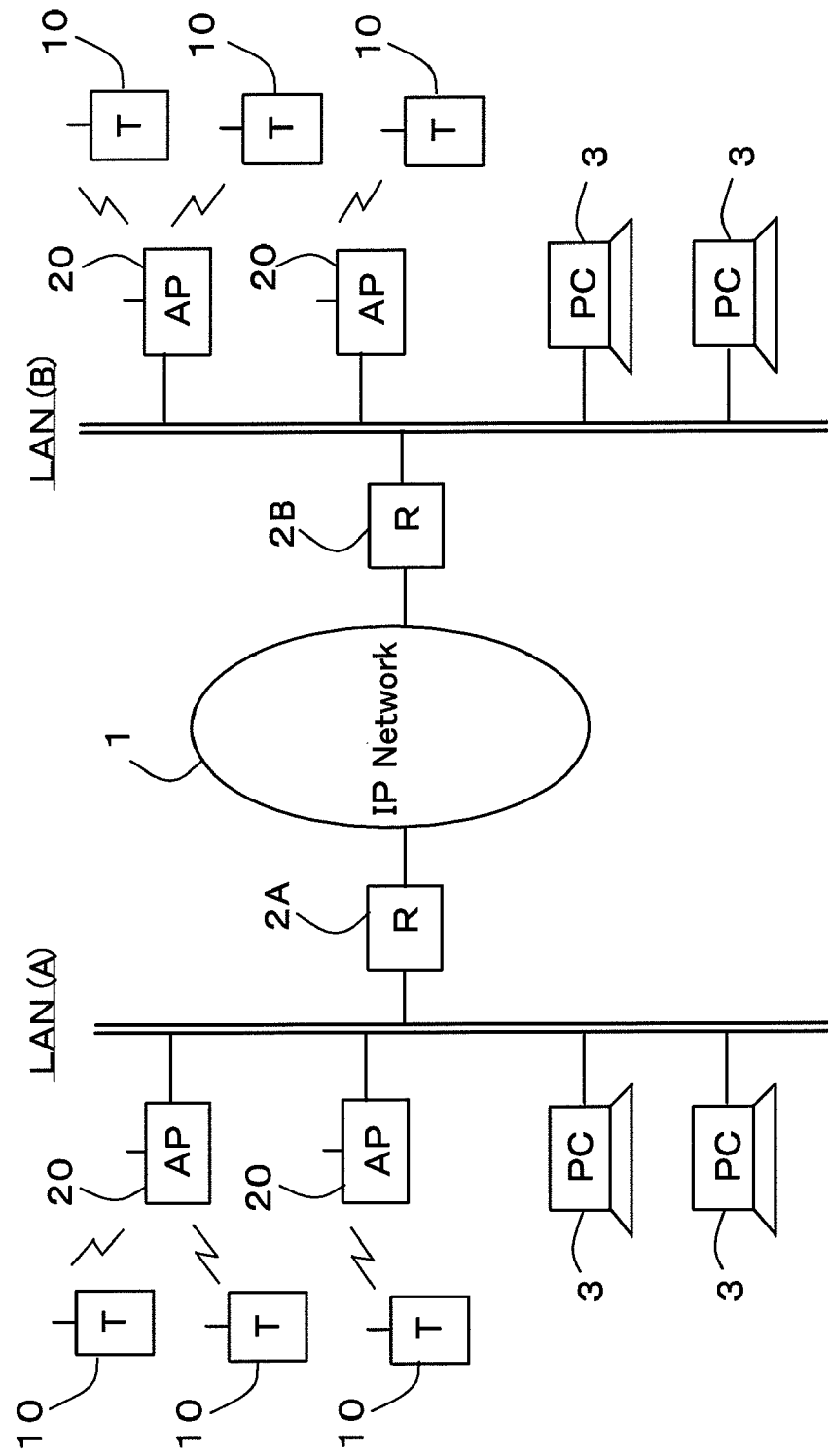
FIG. 1 is a schematic diagram of a wireless communication system in accordance with the present invention.

As shown in FIG. 1, the wireless communication system in accordance with the first embodiment comprises: a plurality of access points 20 and a wired communication terminal 3, respectively connected in wired LANs (Local Area Network) A and B; and a plurality of wireless terminals 20 that communicate with other terminals via the plurality of access points 20. The wired LANs A and B are respectively connected to an IP (Internet Protocol) network 1 via routers 2A and 2B. Each wireless terminal 10 is an information-communication terminal having wireless LAN communication functions operated compatibly with the IEEE 802.11 standard; for example, the plurality of wireless terminals 10 may include telephonic terminals such as wireless IP telephone devices, wireless LAN cards connected to information terminal such as personal computers or PDAs (Personal Digital Assistants), or wireless LAN boards mounted to information terminals.

Each of the access points 20 has wireless LAN communication functions operated compatibly with the IEEE 802.11 standard, and additionally has wired LAN communication functions such as Ethernet® operated compatibly with the IEEE 802.3 standard, conducting wireless LAN communication with wireless terminals 10, and additionally conducting wired LAN communication with other devices (such as wired communication terminals 3 and the routers 2A and 2B) connected on the LANs A and B.

The routers 2A and 2B are respectively interposed between the wired LANs and the IP network 1; these routers monitor both IP packets circulating on the wired LANs as well as IP packets received from the IP network 1, the routers being communication devices which route IP packets based on IP header information of the IP packets (such as the destination IP address and port number information). In the case where it is determined that an IP packet circulating on the wired LAN should be routed to an IP network 1 side, a corresponding router for that LAN transmits the IP packet to the IP network 1. In addition, in the case where it is determined that an IP packet received from the IP network 1 should be routed to a wired LAN side, a corresponding router for that LAN transmits the IP packet to the wired LAN.

The wired communication terminals 3 are personal computers having LAN boards for a wired network. Each wired communication terminal 3 is connected on the LANs A or B and conducts IP communication (i.e., LAN communication) by transmitting and receiving IP packets.

As a result of the above-described configuration, wireless terminals 10 conduct IP communication with other wireless terminals and wired communication terminals 3 in LANs via access points 20, and also IP communication with a variety of-communication terminals connected to this IP network 1 via the routers 2 and the IP network 1.

Figure 2:
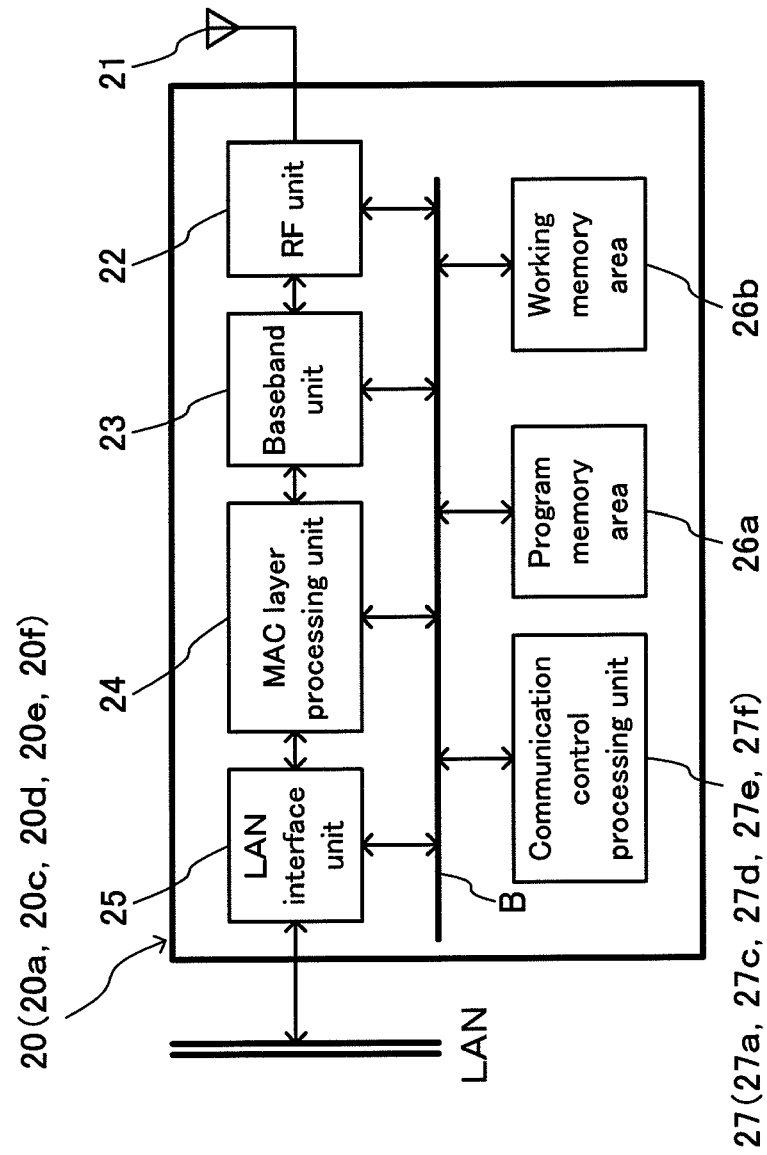
FIG. 2 is a circuit block diagram of an access point in accordance with a first embodiment of the present invention.

As shown in FIG. 2, each-of access points 20 respectively comprises an antenna 21, a RF (Radio Frequency) unit 22, a baseband unit 23, an MAC (Media Access Controller) layer processing unit 24, a LAN interface unit 25, a program memory unit 26*a*, a work memory unit 26*b*, and a communication control processing unit 27. The RF unit 22, the baseband unit 23, the MAC layer processing unit 24, and the LAN interface unit 25 are all connected to the communication control processing unit 27 via a bus B.

The communication control processing unit 27, following a control program or set data recorded in the program memory unit 26*a* and using the work memory unit 26*b*, controls the RF unit 22, the baseband unit 23, the MAC layer processing unit 24, and the LAN interface unit 25.

The LAN interface unit 25, referring to IP addresses and TCP (Transmission Control Protocol) port numbers or UDP (User Datagram Protocol) port numbers of IP packets received from the wired LAN, performs routing of these IP packets based on pre-configured rules.

The MAC layer processing unit 24 conducts MAC layer conversion processing between data link layer of the Ethernet® standard (IEEE 802.3) and data link layer of the wireless LAN standard (IEEE 802.11). The baseband unit 25 modulates MAC processed IP packets for IEEE 802.11, i.e., MAC Flame to baseband signals. On the other hand, the baseband unit 25 also demodulates analog baseband signals and restores the original MAC frames (digital). By the RF unit 22, analog baseband signals received from the baseband unit 23, in accordance with the IEEE 802.11 standard, for example, are transmitted as wireless signals from the antenna 21 at a wireless carrier frequency defined by the DS-SS (Direct Sequence Spread Spectrum) method or the FH-SS (Frequency Hopping Spread Spectrum) method. Furthermore, the wireless carrier frequency is removed from wireless signals received at the antenna 21, and extraction is performed into the original analog baseband signals is performed.

The basic operation of access points 20 will now be described.

First, the operation in the case where access points 20 receive an IP packet from a wired LAN and subsequently transmits this IP packet as a wireless signal from the antenna 21 will be described.

The MAC layer processing unit 24 converts the MAC layer information contained in the frame received from the wired LAN via the LAN interface 25 from the Ethernet® (IEEE 802.3) specification to the wireless LAN (IEEE 802.11) specification, and subsequently passes the results to the baseband unit 23. The baseband unit 23 converts the IP packet received from the MAC layer processing unit 24 to analog baseband signals conforming to the IEEE 802.11 standard, and passes the results to the RF unit 22. The RF unit 22 modulates the baseband signal received from the baseband unit 23 onto a radio carrier wave, and this wave is subsequently transmitted as a wireless signal from the antenna 21.

The operation of one of the plurality of access points 20 in the case where the access point receives a wireless signal from one of the plurality of wireless terminals 10 will now be described.

When the antenna 21 receives a wireless signal from one of the plurality of wireless terminals 10, the RF unit 22 detects a phase difference between this wireless signal and a wireless carrier wave generated at the receiving end. The RF unit 22 subsequently demodulates the signal back to the original analog baseband signal, and then passes this baseband signal to the baseband unit 23. The baseband unit 23 digitizes the baseband signal, thereby restoring the original MAC frame containing the IP packet. The MAC layer processing unit 24 then converts the MAC layer information from the wireless (IEEE 802.11) specification to the Ethernet® (IEEE 802.3) specification. The LAN interface 25 forwards the IP packet received from the MAC layer processing unit 24 to the wired LAN.

Figure 3:
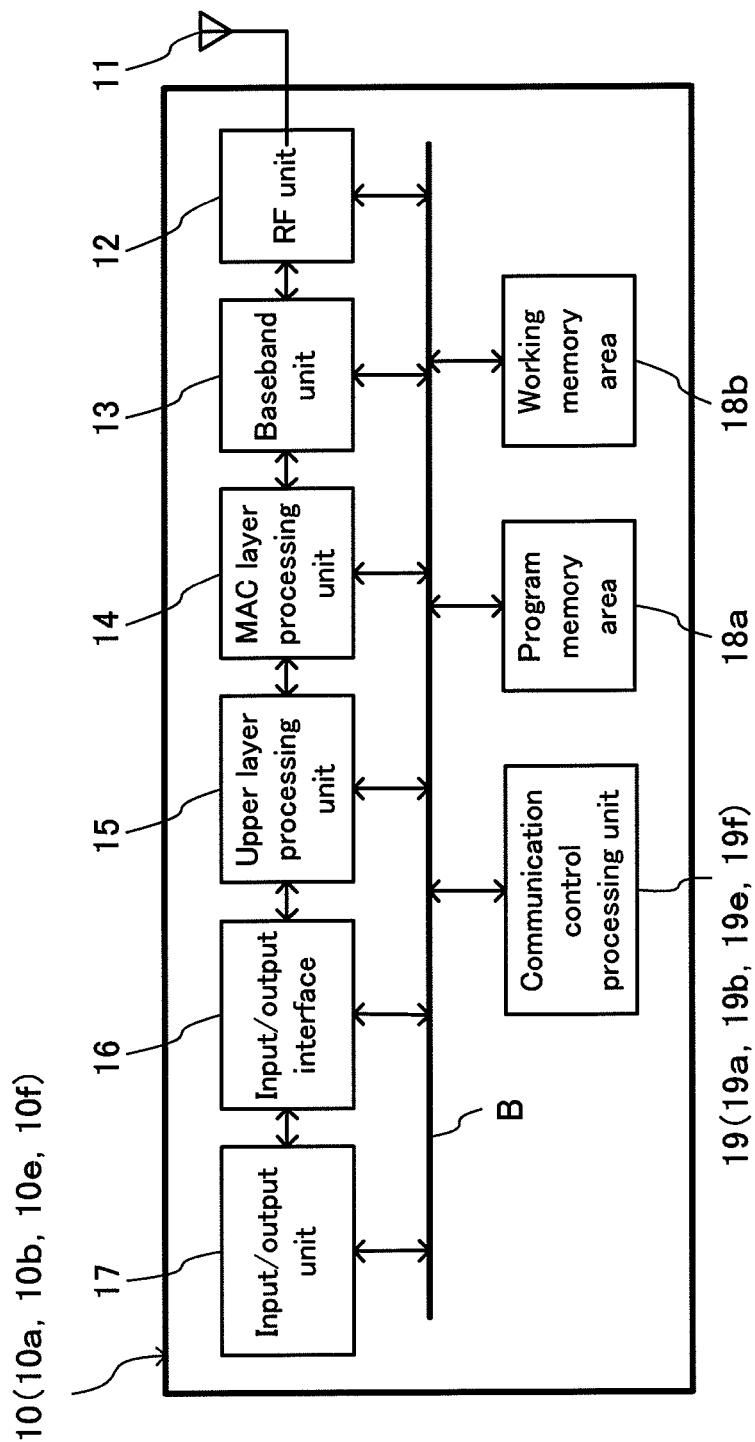
FIG. 3 is a circuit block diagram of a wireless terminal in accordance with the first embodiment of the present invention.

The configuration of one of the plurality of wireless terminals 10 in accordance with the present embodiment will now be described with reference to FIG. 3.

A wireless terminal 10 comprises an antenna 11, an RF unit 12, a baseband unit 13, a MAC layer processing unit 14, an upper layer processing unit 15, an input/output interface 16, an input/output unit 17, a program memory area 18*a*, a working memory area 18*b*, and a communication control processing unit 19. The RF unit 12, the baseband unit 13, the MAC layer processing unit 14, the upper layer processing unit 15, and the input/output interface 16 are all connected to the communication control processing unit 19 via a bus B.

The communication control processing unit 19, following a control program or set data recorded in the program memory area 18*a* and using the working memory area 18*b*, controls the RF unit 12, the baseband unit 13, the MAC layer processing unit 14, the upper layer processing unit 15, and the input/output LAN interface 16.

The input/output unit 17 is, for example, an information processing device such as a computer or PDA. Consequently, the components of this wireless terminal 10, except for the input/output unit 17, are configured as, for example, a wireless LAN card or wireless LAN board. In addition, the input/output unit 17 may also be configured as a telephony device such as an IP telephone. Data and/or encoded voice signals sent from this information device or telephony device are passed to the input/output interface 16, or alternatively, data and/or encoded voice signals from the input/output interface 16 are passed to the information device or telephony device.

The input/output interface 16 is an interface for the input/output unit 17.

The upper layer processing unit 15 conducts IP packet processing related to network/transport layer, and transmits data to and from the network/transport layer. In addition, the upper layer processing unit 15 also adds and deletes IP header information, including IP addresses and TCP port numbers and/or UDP port numbers.

The MAC layer processing unit 14 conducts IP packet processing related to data link layer. In other words, in accordance with the IEEE 802.11 standard, the MAC layer processing unit 14 assembles and fragments IP packets containing data and/or voice packet data, and additionally adds and deletes MAC addresses in order to forward data to and from the data link layer.

The baseband unit 13 modulates IP packets to generate baseband signals, or alternatively demodulates baseband signals to restore original IP packets.

The RF unit 12, in accordance with the IEEE 802.11 standard, modulates baseband signals received from the baseband unit 13 onto a radio carrier frequency, and as a result the signal is transmitted as a wireless signal from the antenna 11. Likewise, the RF unit 12 also performs the reverse, subtracting (demodulating) the radio carrier frequency from wireless signals received by the antenna 11 in order to restore the baseband signal, and subsequently passing the baseband signal to the baseband unit 13.

The basic operation of one of the plurality of wireless terminals 10 will now be described.

First, the operation of one of the plurality of wireless terminals 10 in the case where a data signal and/or encoded voice signal is received from the input/output unit 17 and subsequently transmitted from the antenna 11 will be described.

The input/output interface 16 of the wireless terminal 10 passes the data signal and/or encoded voice signal from the input/output unit 17 to the upper layer processing unit 15. The upper layer processing unit 15 performs IP header processing such as adding an IP address and TCP/UDP port numbers, thereby generating an IP packet. This IP packet is subsequently passed to the MAC layer processing unit 14.

The MAC layer processing unit 14 performs MAC layer processing, such as adding an MAC address according to the procedure described in the IEEE 802.11 standard, on the IP packet forwarded from the upper layer processing unit 15. The IP packet is subsequently passed to the baseband unit 13. The baseband unit 13 generates a baseband signal by modulating the IP packet modified by the MAC layer processing unit in accordance with the IEEE 802.11 standard, and subsequently passes this baseband signal to the RF unit 12. The RF unit 12 modules the baseband signal from the baseband unit 13 onto a radio carrier frequency in accordance with the IEEE 802.11 standard, and this signal is subsequently transmitted as a wireless signal from the antenna 11.

The operation of one of the plurality of wireless terminals 10 in the case where a wireless signal is received from one of the plurality of access points 20 will now be described.

The wireless signal received from the antenna 11 is passed to the RF unit 12. This RF unit 12 subtracts the radio carrier frequency from the wireless signal, thereby restoring the original baseband signal, and subsequently passes this baseband signal to the baseband unit 13. The baseband unit 13 demodulates the received baseband signal, thereby restoring the original IP packet, and subsequently passes the IP packet to the MAC layer processing unit 14.

The MAC layer processing unit 14 deletes the MAC address from the received IP packet in accordance with the IEEE 802.11 standard, and passes the modified IP packet to the upper layer processing unit 15. The upper layer processing unit 15 deletes the TCP/UDP header and/or the IP header based on set data in the IP packet received from the MAC layer processing unit 14, and subsequently sends the resulting obtained data and/or encoded voice signal to the input/output unit 17 via the input/output interface 16.

Figure 4:
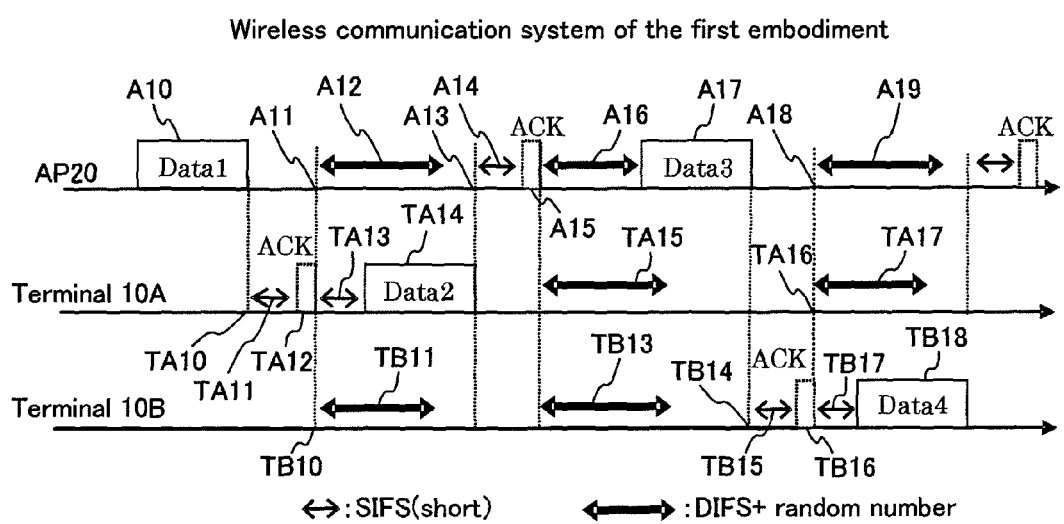
FIG. 4 is a timing chart showing operation of a wireless communication system in accordance with the first embodiment of the present invention.

The operation of the wireless communication system in accordance with the first embodiment of the present invention will now be described with reference to and following the timing chart shown in FIG. 4. It should be appreciated, however, that for the sake of simplicity, the following description of the first embodiment, as well as other embodiments hereinafter described, take as an example the case wherein wireless communication is conducted between a single access point 20 and two wireless terminals 10A and 10B via a single wireless medium. In addition, in the first embodiment to be hereinafter described, the operation of the access point 20 is equivalent to that of an access point according to the conventional art; namely, the access point 20 employs the DCF method as described with reference to FIG. 20. In contrast, the operation of the wireless terminals 10A and 10B is novel.

First, the access point 20 transmits a Data1 signal addressed to the wireless terminal 10A (A10). The Data1 signal referred to herein is taken to be a single IP packet, or alternatively, the last IP packet of a plurality of IP packets into which a large amount of data was segmented (i.e., a fragment). In this case, in order to announce that there are no more IP packet fragments forthcoming, the "more fragments" flag is reset according to the IEEE 802.11 standard. As shown in FIG. 19, this "more fragments" flag is included in the MAC header of the MAC frame. The MAC frame consists of: a frame control field for specifying the frame type and other parameters, a duration field for specifying the duration time, a destination address field, a source address field (the foregoing fields are collectively referred to as the MAC header), the frame body where the actual data is stored, and a frame check sequence field (using a parity bit method) for detecting errors in the frame. The "more fragments" flag is located in the frame control field of the MAC header.

In the case where the wireless terminal 10A normally receives a Data1 signal from the access point 20 (TA10), and furthermore where the "more fragments" flag is reset, the wireless terminal 10A waits an SIFS interval (TA11), and subsequently returns an ACK signal addressed to the access point 20 wherein the "more fragments" flag is reset (TA12). At this point, if the wireless terminal 10A has transmission data, immediately after transmitting the ACK signal, the wireless terminal 10A waits an SIFS interval (TA13), and subsequently transmits a Data2 signal addressed to the access point 20 (TA14).

Meanwhile, the access point 20 and the other wireless terminal 10B receive the ACK signal from the wireless terminal 10A (A11, TB10), and in accordance with the IEEE 802.11 standard, respectively wait (DIFS+random number) intervals (A12, TB11). In this way, since the wireless terminal 10A only waits an SIFS (<DIFS) interval immediately after transmitting the ACK signal, the wireless terminal 10A obtains priority transmission rights over the other devices, i.e., the access point 20 and the wireless terminal 10B. For this reason, even though the wireless terminal 10A transmits the Data2 signal addressed to the access point 20 (TA14) after an SIFS interval (TA13), the access point 20 is able to receive this Data2 signal without interference (A13).

The access point 20, upon receiving from the wireless terminal 10A a valid Data2 signal (A13), waits an SIFS interval (A14), and subsequently transmits an ACK signal to notify the wireless terminal 10A that a Data2 signal was normally received (A15). Once this ACK signal is transmitted, each device (in other words, the access point 20 and the wireless terminals 10A and 10B) respectively waits a (DIFS+ random number) interval (A16, TA15, TB13), and during these respective intervals each device detects whether or not a receiving wireless signal is present.

For the purposes of this example, it is supposed that the access point 20 is the first to finish its the (DIFS+random number) waiting time, and since the access point 20 has received no receiving wireless signals during this interval, obtains transmission rights. Subsequently, the access point 20 transmits, for example, a Data3 signal addressed to the wireless terminal 10B (A17).

The wireless terminal 10B, upon normally receiving a Data3 signal (TB14), waits an SIFS interval (TB15), and subsequently transmits an ACK signal to the access point 20 (TB16). At this point, if the "more fragments" flag in the MAC header of the Data3 signal is reset, the "more fragments" flag in the MAC header of the responding ACK signal will also be reset. In the case where the "more fragments" flag is reset and the wireless terminal 10B has transmission data, the wireless terminal 10B waits an SIFS interval (TB17) immediately after transmitting the ACK signal, and subsequently transmits a Data4 signal addressed to the access point 20 (TB18).

Meanwhile, the access point 20 and the other wireless terminal 10A respectively receive the ACK signal from the wireless terminal 10B (A18, TA16), and in accordance with the IEEE 802.11 standard, wait (DIFS+random number) intervals (A19, TA17). In this way, the wireless terminal 10B only waits an SIFS interval immediately after transmitting the ACK signal, while the other devices (i.e., the access point 20 and the wireless terminal 10A) each wait a (DIFS+random number) interval after receiving the ACK signal. As a result, the wireless terminal 10B obtains priority transmission rights over the other devices. For this reason, even though the wireless terminal 10B transmits the Data4 signal addressed to the access point 20 (TB18) after an SIFS interval (TB17), the access point 20 is able to receive this Data4 signal without interference (A20).

Figure 5:
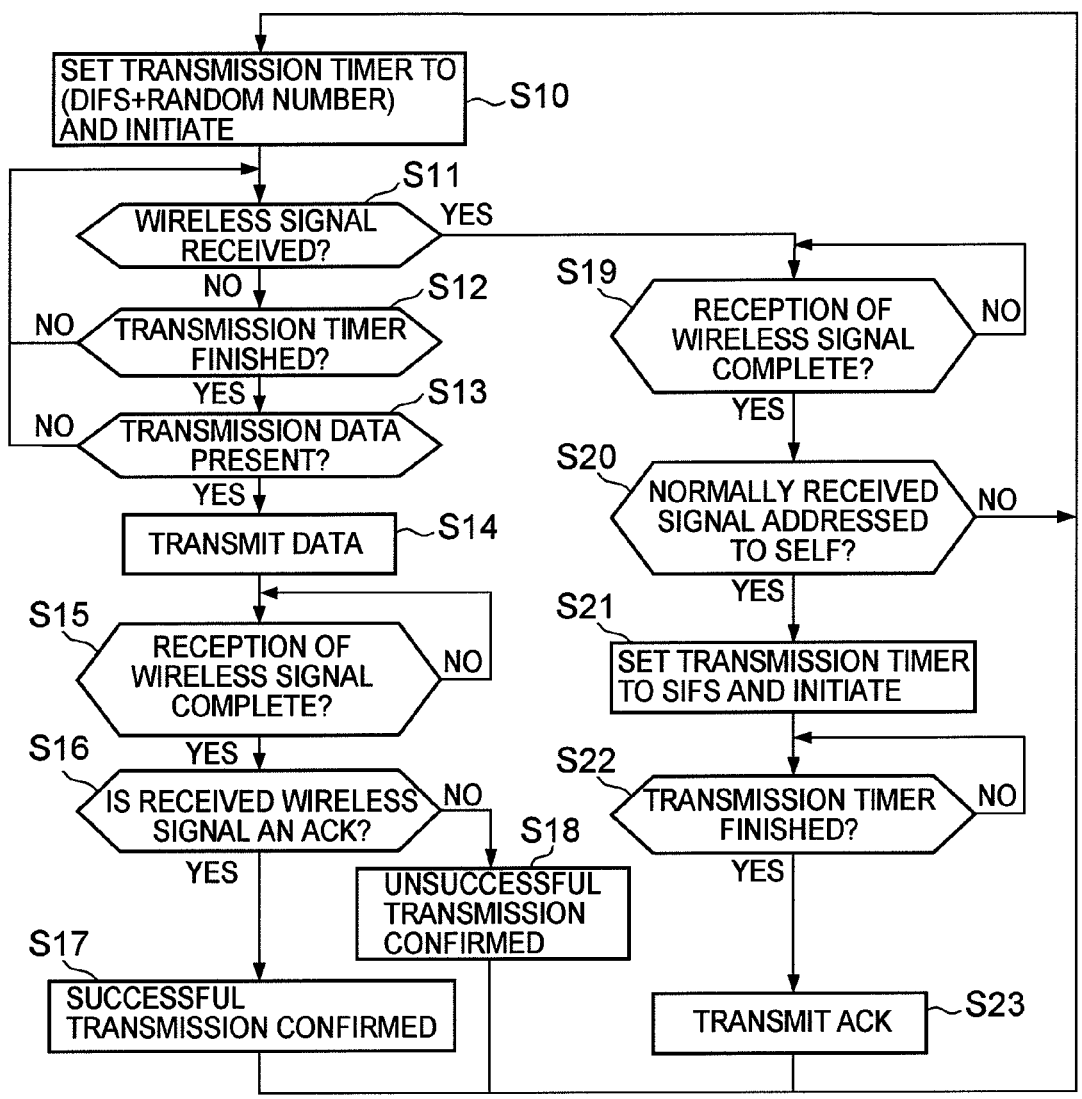
FIG. 5 is a flowchart showing the operation of a communication control processing unit of an access point, and of an access point as well as a wireless terminal employing a conventional DCF method in accordance with the first embodiment of the present invention.

The operation of the communication control processing unit 27 of the access point 20 in accordance with the first embodiment will now be described with reference to and following the flowchart shown in FIG. 5. It should be appreciated, however, that as described above, the operation of the access point 20 of the first embodiment is equivalent to the operation of access points and conventional wireless terminals; namely, the access point 20 employs the DCF method as described with reference to FIG. 20.

The communication control processing unit 27 of the access point 20 sets a transmission timer to a value equal to (DIFS+random number), and subsequently initiates this transmission timer (S10). It is then determined whether or not a receiving wireless signal is present (S11). If a receiving wireless signal has been received, the process proceeds to step S19, while if a receiving wireless signal has not been received, the process proceeds to step S12. In step S12, it is determined whether or not the transmission timer has finished. If the timer has not finished, the process returns to step S11, while if the timer has finished, the process proceeds to step S13. In step S13, it is determined whether or not there is transmission data present. If there is no transmission data, the process returns to step S11, while if there is transmission data, the process proceeds to step S14.

In step S14, the transmission data is transmitted from the antenna 21. During the process of creating this transmission data, the communication control processing unit 27 either sets or resets the "more fragments" flag. Upon transmission of this data, the communication control processing unit 27 waits for a receiving wireless signal (S15). If a receiving wireless signal is received, it is determined whether or not this wireless signal is an ACK signal addressed to itself (S16).

If it is determined that the receiving wireless signal is an ACK signal addressed to the access point 20 itself, it is confirmed that the transmission of data in step 14 was successful (S17), and the process returns again to step S10. However, if it is determined that the receiving wireless signal is not an ACK signal addressed to the access point 20 itself, it is confirmed that the transmission of the data in step S14 was unsuccessful (S18), and the process returns to step S10. In the case where it is confirmed that the data transmission was unsuccessful, the unsuccessfully transmitted data may be retransmitted according to higher level protocols.

After setting a value equal to (DIFS+random number) to the transmission timer in step S10, the process wherein steps S11, S12, and S13 are repeatedly executed is conducted. If a receiving wireless signal is received (S11), the process proceeds to step S19 as described above.

In step S19, the communication control processing unit 27 waits until the receiving wireless signal is completely received, and subsequently determines whether or not this wireless signal is addressed to the access point 20 itself (S20). At this point, if it is determined that the wireless signal is not addressed to the access point 20 itself, the process returns to step S10, while if it is determined that the wireless signal is addressed to the access point 20 itself, the transmission timer is set to a value equal to SIFS and the transmission timer is initiated (S21). Additionally, the communication control processing unit 27 waits until the transmission timer has finished (S22), and subsequently causes an ACK signal to be transmitted from the antenna 21 (S23), and the process then returns to step S10. It should also be appreciated that if either of the "more fragments" flags in the MAC headers of the data received in steps S11 and S19 are set, the "more fragments" flag of the ACK signal transmitted in step S23 is also set; likewise, if the "more fragments" flag of the received data is reset, the flag of the ACK signal is also reset.

Figure 6:
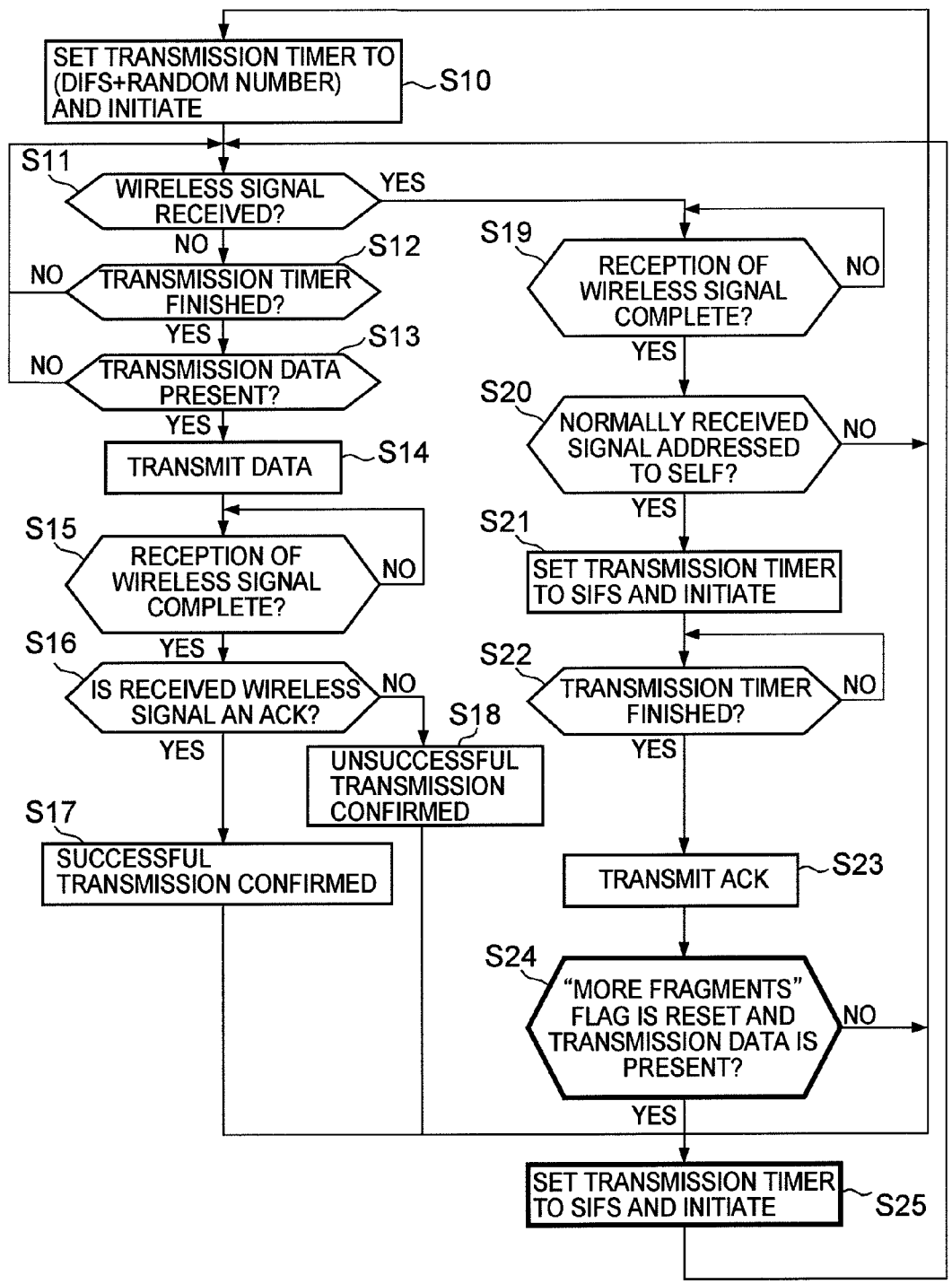
FIG. 6 is a flowchart showing the operation of the communication control processing unit of a wireless terminal in accordance with the first embodiment, and of a wireless terminal as well as an access point in accordance with a fifth embodiment of the present invention.

The operation of the communication control processing unit 19 of the wireless terminals 10 in accordance with the first embodiment will now be described with reference to and following the flowchart shown in FIG. 6. It should be appreciated, however, that the operation of the communication control processing unit 19 of the wireless terminals 10 in accordance with the first embodiment is almost the same as the operation of the communication control processing unit 27 of the above-described access point 20. In other words, identical reference numbers will be used for the portions of the operation of the wireless terminals 10 that are equivalent to those of the wireless terminal in accordance with the conventional art. Furthermore, the description of identical portions will be simplified for the sake of brevity. In addition, in the flowcharts to be hereinafter referenced, including the one shown in FIG. 6, that illustrate the operation of the embodiments of the present invention, the operational steps that differ from the operational steps in FIG. 5 are outlined in bold symbols.

In the same manner as the operation of the above-described communication control processing unit 27 of the access point 20 as well as the operation of a wireless terminal in accordance with the conventional art, the communication control processing unit 19 of the wireless terminals 10 conducts the following processing steps. The communication control process 19 sets a transmission timer to a value equal to (DIFS+ random number) (S10), determines whether or not a receiving wireless signal is present (S11), determines whether the transmission timer has finished (S12), determines whether transmission data is present (S13), transmits data (S14), waits to receive a receiving wireless signal (S15), determines whether or not a received signal is an ACK signal (S16), confirms successful transmission in the ACK signal case (S17), and confirms unsuccessful transmission in the non-ACK signal case (S18).

The communication control processing unit 19 of the wireless terminals 10, upon determining that a receiving wireless signal is present in step S11, conducts the following processing steps. The communication control processing unit 19 waits until the receiving wireless signal is completely received (S19), determines whether or not the signal is addressed to the wireless terminal itself (S20), sets the transmission timer to a value equal to SIFS (S21), determines whether the transmission timer has finished (S22), and transmits an ACK signal (S23).

Subsequently, as part of the transmitting characteristics of the wireless terminals 10 in accordance with the first embodiment, the communication control processing unit 19 determines whether or not the "more fragments" flag in the MAC header of the ACK signal received in step 23 is reset, and additionally, whether or not transmission data is present (S24). If the "more fragments" flag is not reset, or alternatively if transmission data is not present, the process returns to step S10 as in the operation of a wireless terminal in accordance with the conventional art. However, if the "more fragments" flag is reset, and additionally transmission data is present, the transmission timer is set to a value equal to an SIFS interval, the transmission timer is initiated (S25), and the process subsequently returns to step S11. As described with reference to FIG. 4, at this point, the other wireless terminal and the access point 20 have been respectively in a wait status over the interval (DIFS+random number) (A12, TB11, A19, TA17) from the point when the ACK signal transmitted in step 23 (TA12, TB16) was received. For this reason, the wireless terminal 10 does not receive wireless signals from other devices, and therefore data can be transmitted from the antenna 11 (S14, TA14, TB18) via the process described in steps S11, S12, and S13.

As described in the foregoing, in the first embodiment, one of the wireless terminals 10 receives a data signal from the access point 20, and after subsequently transmitting an ACK signal, waits only an SIFS interval before transmitting its own transmission data signal. As a result, transmission efficiency is improved. Moreover, when one of the wireless terminals 10 transmits an ACK signal, other devices wait a (DIFS+random number) interval in accordance with the IEEE 802.11 standard, and therefore no interference occurs between the data signal of the single wireless terminal 10 and signals from other devices. For this reason, even if conventional wireless terminals coexist as wireless terminals connected to the access point 20 in addition to the wireless terminals 10 in accordance with the first embodiment of the present invention, signal interference does not occur.

In this way, in the first embodiment, signal interference is suppressed while improving transmission efficiency. By taking advantage of the fact that, among the plurality of devices constituting the wireless LAN, only one of the wireless terminals 10 receives data signals addressed to the terminal itself from the access point 20 and transmits an ACK signal to the access point 20, this one wireless terminal 10 finishes its waiting time sooner than the other devices, and as a result is able to transmit the next data signal.

Furthermore, since in the first embodiment the access point 20 may be used as a general-purpose access point, installation costs can be alleviated.

In the first embodiment, when one of the wireless terminals 10 transmits a data signal after transmitting an ACK signal, the single wireless terminal 10 waits an SIFS interval after transmitting the ACK signal. However, it should also be appreciated that this waiting time may be any interval shorter than the DIFS interval. For example, the PIFS (PCF [Point Coordination Function] Inter Frame Space), or the AIFS(1), the shortest interval from among the four types of AIFS (Arbitration Inter Frame Space) intervals, may also be employed as the waiting time.

Second Embodiment

A wireless communication system in accordance with the second embodiment of the present invention will now be described.

The wireless communication system of the second embodiment is fundamentally similar to the wireless communication system of the first embodiment described with reference to FIG. 1. In addition, the access point and the wireless terminals constituting the wireless communication system are also fundamentally similar to the access point and the wireless terminals of the first embodiment described with reference to FIGS. 2 and 3. However, the access point 20a of the second embodiment, specifically the operation of the communication control processing unit 27a (FIG. 2) thereof, differs slightly from the operation of the communication control processing unit 27 of the access point 20 of the first embodiment. In addition, the wireless terminals 10a of the second embodiment, specifically the operation of the communication control processing unit 19a (FIG. 3) thereof, differs slightly from the operation of the communication control processing unit 19 of the wireless terminals 10 of the first embodiment. Consequently, hereinafter only the operation of the access point 20a and the wireless terminals 10a of the second embodiment will be described. Furthermore, in the following descriptions of subsequent embodiments, the configuration of the wireless system, as well as the configuration of the access point and the wireless terminals, is respectively equivalent to that of the first embodiment. For that reason, since only the operation of the respective communication control processing units of the access points and the wireless terminals of the several embodiments herein differ from each other, the description hereinafter will be limited to the description of the respective operations thereof.

Figure 7:
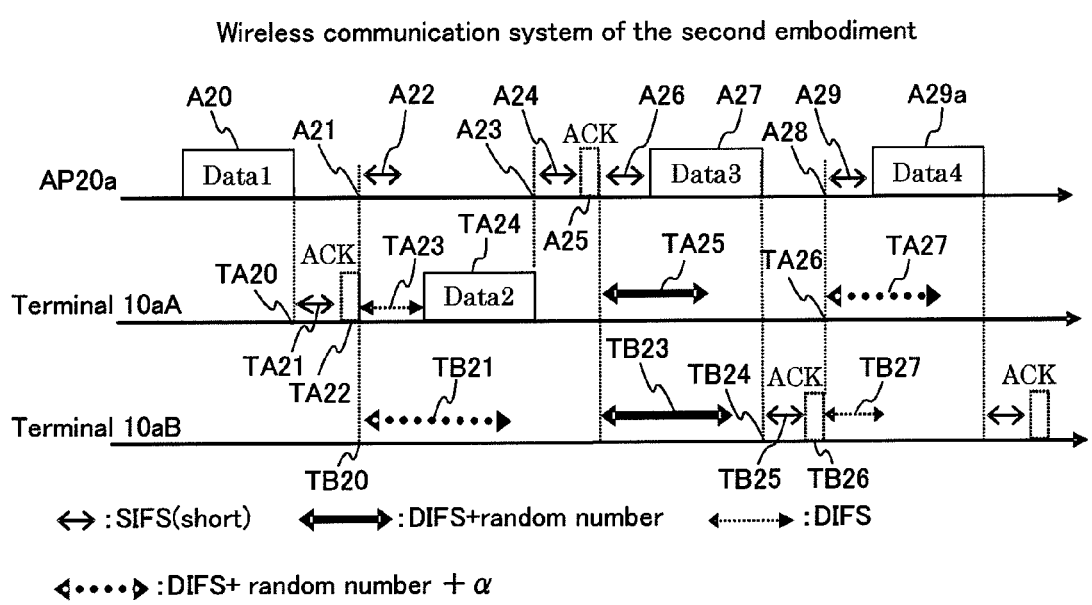
FIG. 7 is a timing chart showing the operation of a wireless communication system in accordance with a second embodiment of the present invention.

FIG. 7 is a timing chart showing the operation of a wireless communication system in accordance with the second embodiment of the present invention.

First, an access point 20a transmits a Data1 signal addressed to a wireless terminal 10aA (A20). The Data1 signal referred to herein is taken to be a single IP packet, or alternatively, a last fragmented IP packet. In this case, the "more fragments" flag is reset in accordance with the IEEE 802.11 standard.

The wireless terminal 10aA normally receives a Data1 signal from the access point 20a (TA20). Moreover, in the case where the "more fragments" flag in this signal is reset, the wireless terminal 10aA waits an SIFS interval (TA21), and subsequently returns an ACK signal including the reset "more fragments" flag addressed to the access point 20a (TA22). At this point, if the wireless terminal 10aA has transmission data, immediately after transmitting the ACK signal, the wireless terminal 10aA waits a DIFS interval (TA23), and transmits a Data2 signal addressed to the access point 20a if it does not receive wireless signals from other devices (TA24).

Meanwhile, the other wireless terminal 10aB, upon receiving an ACK signal from the wireless terminal 10aA (TB20), waits a (DIFS+random number+α) interval (TB21). For this reason, among the plurality of wireless terminals connected to the access point 20a, the wireless terminal 10aA is certain to obtain priority transmission rights to transmit the next wireless signal. Furthermore, by adding a value α (α>0) to (DIFS+random number) as the waiting time for the other wireless terminal 10aB, the waiting time of the wireless terminal 10aB will not match that of the wireless terminal 10aA, even in the case where the random number is zero. In addition, in the second embodiment, the waiting time of the access point 20a is always the SIFS. For this reason, when the access point 20a receives an ACK signal from the wireless terminal 10aA (A21), the access point 20a waits an SIFS (A22), and in the case where transmission data is present, becomes able to transmit this data before either the wireless terminal 10aA or 10aB. As a result, this data transmission does not interfere with data transmissions from either the wireless terminal 10aA or 10aB.

At this point, wherein the access point 20a has no transmission data, and therefore the wireless terminal 10aA obtains transmission rights. As described above, the wireless terminal 10aA subsequently transmits a Data2 signal addressed to the access point 20a (TA24). By contrast, if in this case neither the access point 20a nor the wireless terminal 10aA have any further transmission data, the wireless terminal 10aB will receive no wireless signals during the (DIFS+random number+α) waiting time, and therefore the wireless terminal 10aB will obtain transmission rights.

The access point 20a, upon receiving a valid Data2 signal from the wireless terminal 10aA (A23), waits an SIFS interval (A24), and subsequently transmits an ACK signal notifying the wireless terminal 10aA that a Data2 signal was normally received (A25). Once this ACK signal is transmitted, each wireless terminal 10aA and 10aB respectively waits a (DIFS+random number) interval (TA25, TB23), and detects whether receiving wireless signals are present during this interval. In other words, if the wireless terminals 10aA and 10aB in accordance with the second embodiment receive an ACK signal from another wireless terminal, the wireless terminals 10aA and 10aB respectively wait a (DIFS+random number+α) interval, whereas if these terminals receive an ACK signal from the access point 20a, the terminals respectively wait a (DIFS+random number) interval in accordance with the IEEE 802.11 standard.

Since the SIFS waiting time of the access point 20a is shorter than the respective (DIFS+random number) intervals of the wireless terminals 10aA and 10aB, the waiting time of the access point 20a finishes first. At this point, it is supposed that the access point 20a has transmission data, and for example transmits a Data3 signal addressed to the wireless terminal 10aB.

The wireless terminal 10aB, upon receiving a valid Data3 signal (TB24), waits an SIFS interval (TB25), and subsequently transmits an ACK signal to the access point 20a (TB26). At this point, if the "more fragments" flag in the MAC header of the Data3 signal is reset, the "more fragments" flag in the MAC header of the responding ACK signal will also be reset. In the case where the "more fragments" flag is reset and further transmission data is present, the wireless terminal 10aB waits a DIFS (TB27) immediately after transmitting the ACK signal. If no receiving wireless signals are received during this DIFS, the wireless terminal 10aB transmits a data signal addressed to the access point 20a.

Meanwhile, the other wireless terminal 10aA, upon receiving the ACK signal from the wireless terminal 10aB (TA26), waits a (DIFS+random number+α) interval (TA27). In addition, the access point 20a, upon receiving an ACK signal from the wireless terminal 10aB (A28), waits an SIFS (A29), and in the case where transmission data is present, transmits a Data4 signal addressed to the wireless terminal 10aB (A29a). As described above, since in this case the waiting time of the access point 20a is shorter than that of both of the wireless terminals 10aA and 10aB, this data transmission does not interfere with data transmissions from either the wireless terminal 10aA or 10aB.

Figure 8:
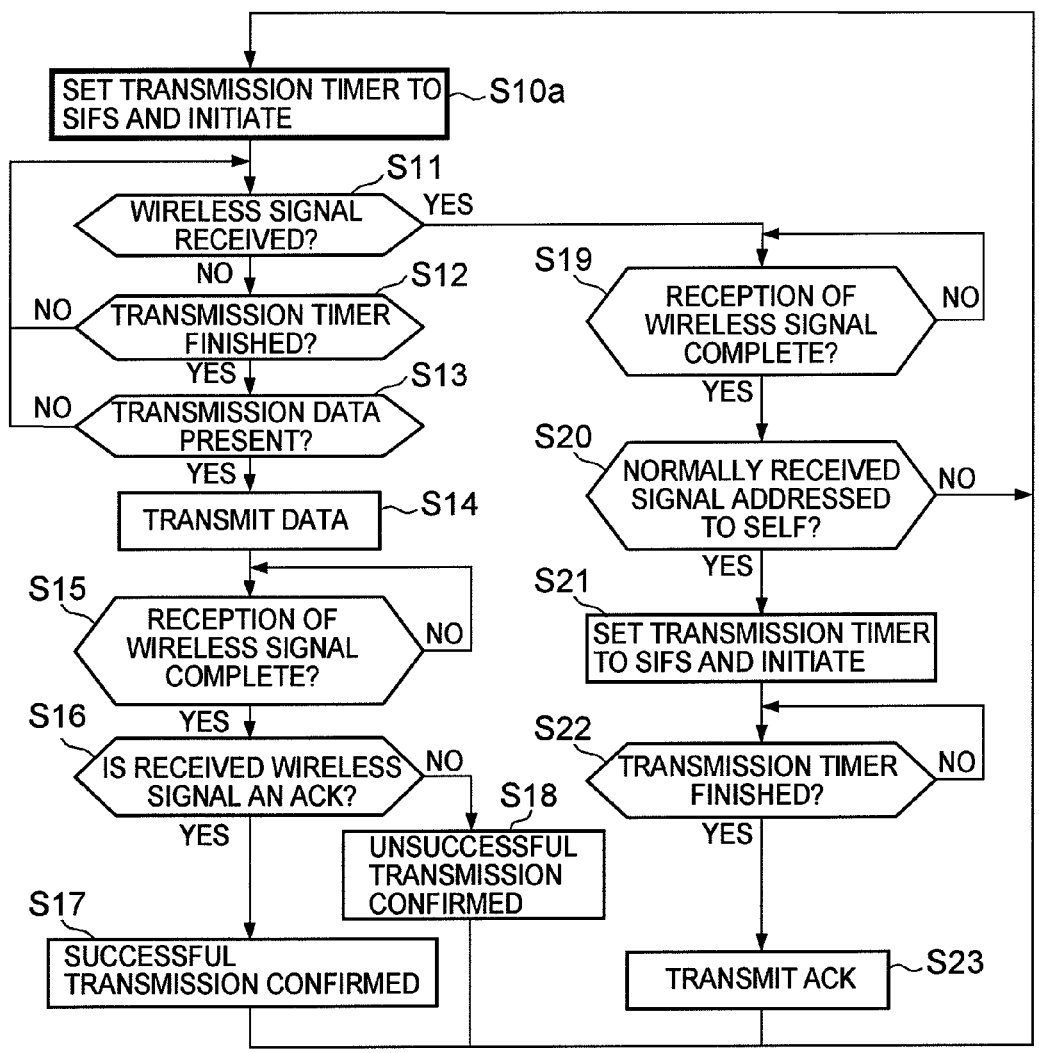
FIG. 8 is a flowchart showing the operation of the communication control processing unit of an access point in accordance with the second and third embodiments of the present invention.

The operation of the communication control processing unit 27a of the access point 20a in accordance with the second embodiment will now be described with reference to and following the flowchart shown in FIG. 8.

As described above, the access point 20a of the second embodiment has a waiting time that is always equal to the SIFS. For this reason, among the operational steps of the access point employing the DCF method in accordance with the conventional art as described with reference to FIG. 5, the step S10 wherein a transmission timer is set to a value equal to (DIFS+random number) is changed to a step S10a wherein the transmission timer is set to a value equal to the SIFS. All other operational steps other than this step S10a are identical to the operational steps of an access point employing the DCF method in accordance with the conventional art.

Figure 9:
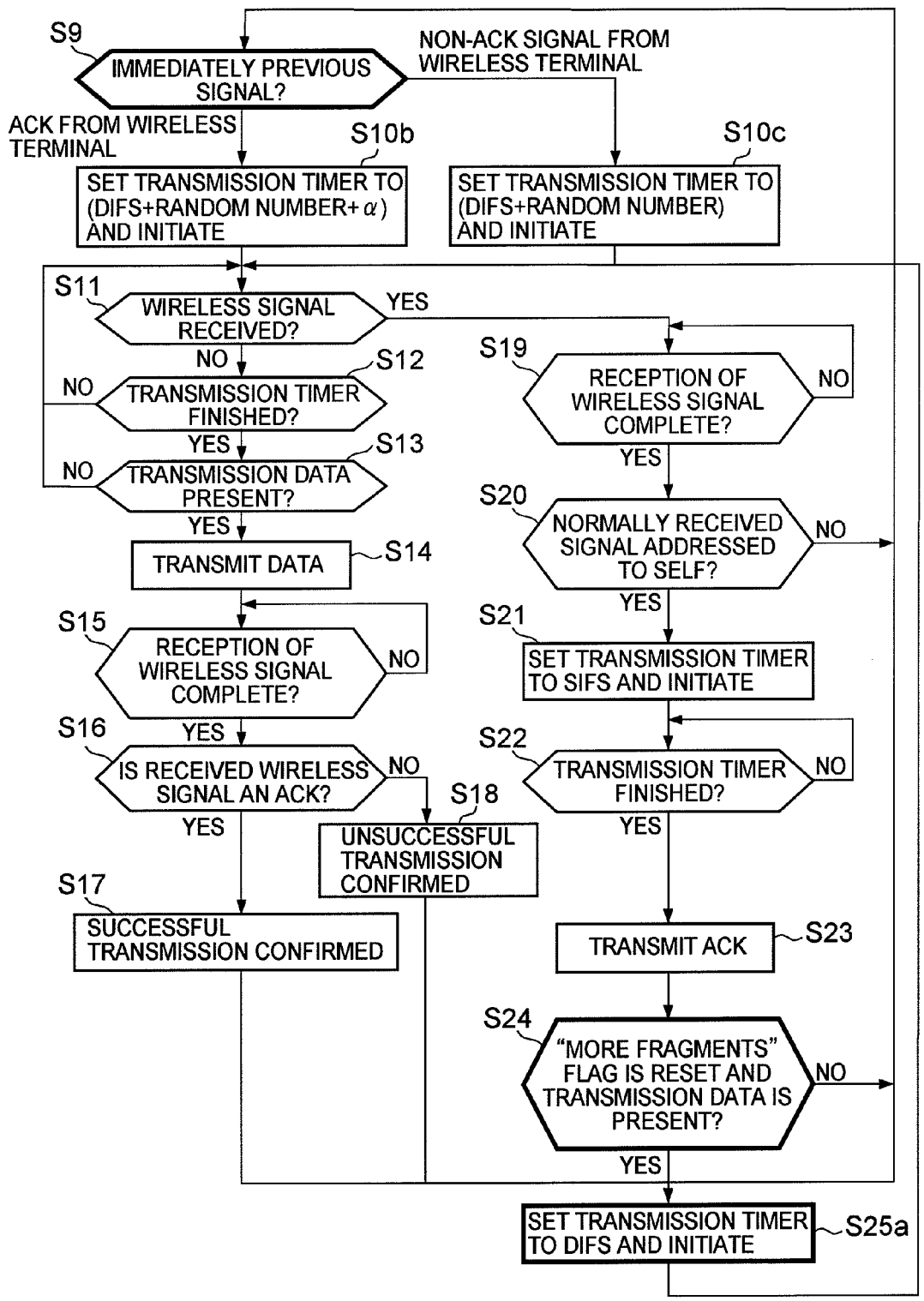
FIG. 9 is a flowchart showing the operation of the communication control processing unit of a wireless terminal in accordance with the second embodiment of the present invention.

The operation of the communication control processing unit 19a of the wireless terminals 10a of the second embodiment will now be described with reference to and following the flowchart shown in FIG. 9.

As described above, the wireless terminals 10a of this embodiment change their respective waiting times according the receiving signal. For this reason, among the operational steps of the wireless terminal employing the DCF method in accordance with the conventional art as shown in FIG. 5, the step S10, wherein a transmission timer is set to a value equal to (DIFS+random number), differs in the present embodiment.

In the present embodiment, when setting the transmission timer, the communication control processing unit 19a first determines whether the receiving signal received immediately prior was an ACK signal from another wireless terminal, or another type of signal (S9). In the case where the receiving signal received immediately prior was an ACK signal from another wireless terminal, the communication control processing unit 19a sets the transmission timer to a value equal to (DIFS+random number+α), and subsequently initiates this transmission timer (S10b, TB21, TA27). In the case where the receiving signal received immediately prior was another type of signal (including ACK signals from the access point 20a), the communication control processing unit 19a sets the transmission timer to a value equal to (DIFS+random number), and subsequently initiates this transmission timer (S10c, TA25, TB23). In either case (S10b or S10c), the communication control processing unit 19a subsequently determines whether or not a new wireless signal was received (S11), in a manner identical to that of a wireless terminal employing the DCF method in accordance with the conventional art.

In addition, after causing an ACK signal to be transmitted from the antenna 11 in step S23, the communication control processing unit 19a, unlike the conventional wireless terminals, determines whether or not the "more fragments" flag in the MAC header of this ACK signal is reset, as well as whether or not further transmission data is present (S24). In the case where the "more fragments" flag is not reset, and/or transmission data is not present, the process returns to step S9. However, in the case where the "more fragments" flag is reset, and additionally transmission data is present, the communication control processing unit 19a sets the transmission timer to a value equal to the DIFS, and after subsequently initiating this transmission timer (S25a, TA23, TB27), the process returns to step S11. As described with reference to FIG. 7, at this point the other wireless terminal has been in a wait status over the interval (DIFS+random number+α) (TB21, TA27) from the point when the ACK signal transmitted in step 23 (TA22, TB26) was received. For this reason, the present one of the wireless terminals 10a does not receive a wireless signal from the other wireless terminal, and therefore is able to transmit data from the antenna 11 (S14, TA24) via the process described in steps S11, S12, and S13. However, the above does not hold true in the case where the present one of the wireless terminals 10a receives a wireless signal from the access point 20a in step S11.

As described above, in the present embodiment, when one of the wireless terminals 10a receives a data signal from the access point 20a, the single one of the wireless terminals 10a transmits an ACK signal and subsequently waits only a DIFS interval before transmitting its own data signal. As a result, transmission efficiency is improved. Moreover, since the waiting time of the access point 20a is always the SIFS interval, the overall transmission efficiency of the wireless communication system as a whole is further improved over that of the first embodiment.

However, in the present embodiment, when the access point 20a continually transmits, in series, wireless signals addressed to a plurality of wireless terminals, the frequency of application of the characteristic feature of the present embodiment (namely, the granting of priority transmission rights to a wireless terminal immediately after an ACK transmission) is lowered, and as a result improving transmission efficiency becomes difficult. Whether the access point 20a continually transmits, in series, wireless signals addressed to a plurality of wireless terminals, depends on the individual design of the access point. Depending on the limitations of the processing capacity of the access point, in some cases it may be difficult for the access point to transmit to a wireless terminal in series immediately after having transmitted to a different wireless terminal. The present embodiment is particularly suited to those cases wherein the processing capacity of the access point is limited in such a way. However, to reiterate, if the processing capacity of the access point is high and the access point is able to transmit data signals in series for as long as transmission data is present, there is a possibility that the transmission control of the present embodiment will not function effectively.

In addition, in the case where general-purpose wireless terminals coexist on the same wireless LAN, the waiting time for these general-purpose wireless terminals will be (DIFS+ random number). As a result, if by chance the random number is zero for one of these wireless terminals, there is the possibility that the one general-purpose wireless terminal and one of the wireless terminals in accordance with the present embodiment will commence signal transmission simultaneously, thereby causing interference.

In this case, if instead of the DIFS, the waiting time for the priority wireless terminals (i.e., the wireless terminals in accordance with the present embodiment) is configured to have a value longer than the SIFS interval and shorter than the DIFS interval, it is possible for other wireless terminals on the same wireless LAN to have the conventional (DIFS+random number) waiting time. As a result, even if two or more general-purpose wireless terminals having (DIFS+random number) waiting times experience interference, the case wherein signals from these wireless terminals interfere with those of a priority terminal no longer occurs. As an example of an interval that is longer than the SIFS interval and shorter than the DIFS interval, the waiting time stipulated in accordance with IEEE 802.11 standards by the PCF method that is uniformly imposed as a transmission control by the access point, in other words the PIFS, may be employed as the waiting time of the priority wireless terminals. A third embodiment of the present invention that follows this principle will be hereinafter described.

Third Embodiment

Figure 10:
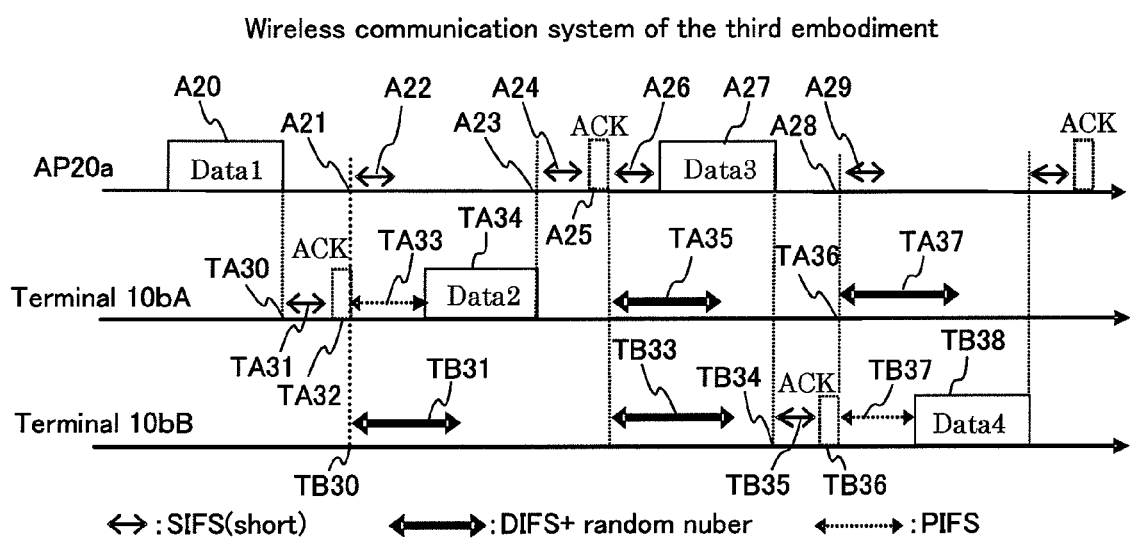
FIG. 10 is a timing chart showing the operation of a wireless communication system in accordance with the third embodiment of the present invention.

FIG. 10 is a timing chart showing the operation of a wireless communication system in accordance with the third embodiment of the present invention. The access point of the third embodiment is identical to the access point 20a of the second embodiment.

First, for the purposes of this example, it is supposed that the access point 20a transmits a Data1 signal addressed to the wireless terminal 10bA (A20). The Data1 signal referred to herein is taken to be a single IP packet, or alternatively the last IP packet of a fragmented datagram.

In the case where the wireless terminal 10bA normally receives a Data1 signal from the access point 20a (TA30), and furthermore wherein the "more fragments" flag therein is reset, the wireless terminal 10bA waits an SIFS interval (TA31), and subsequently returns an ACK signal addressed to the access point 20a wherein the "more fragments" flag is reset (TA32). At this point, if the wireless terminal 10bA has transmission data, the wireless terminal 10bA waits a PIFS interval (TA33) immediately after transmitting the ACK signal. If the wireless terminal 10bA furthermore receives no wireless signals from other devices during this interval, the wireless terminal 10bA transmits a Data2 signal addressed to the access point 20a (TA34).

Meanwhile, the other wireless terminal 10bB, upon receiving an ACK signal from the wireless terminal 10bA (TB30), waits a (DIFS+random number) interval (TB31). For this reason, even in the case where a plurality of the wireless terminals 10b in accordance with the present embodiment, as well as a plurality of conventional wireless terminals, are connected to the access point 20a, the wireless terminals of either type wait a (DIFS+random number) interval that is longer than the PIFS interval. As a result, the wireless terminal 10bA is certain to obtain priority transmission rights to transmit the next wireless signal. In addition, in the third embodiment, the waiting time of the access point 20a is always the SIFS, equivalent to that of the second embodiment. For this reason, the access point 20a, upon receiving an ACK signal from the wireless terminal 10bA (A21), waits an SIFS (A22). In the case where transmission data is present, the access point 20a is able to transmit this data before either the wireless terminal 10bA or 10bB. As a result, this data transmission does not interfere with data transmissions from either the wireless terminal 10bA or 10bB.

At this point, it is supposed that the access point 20a has no transmission data, and therefore the wireless terminal 10bA obtains transmission rights, and as described above, transmits a Data2 signal addressed to the access point 20a (TA34). By contrast, if in this case neither the access point 20a nor the wireless terminal 10bA has further transmission data, the wireless terminal 10bB will receive no wireless signal during its (DIFS+random number) waiting time, and therefore the wireless terminal 10bB will obtain transmission rights.

The access point 20a, upon receiving a valid Data2 signal from the wireless terminal 10bA (A23), waits an SIFS interval (A24), and subsequently transmits an ACK signal notifying the wireless terminal 10bA that a Data2 signal was normally received (A25). Once this ACK signal is transmitted, each wireless terminal 10bA and 10bB respectively waits a (DIFS+random number) interval (TA35, TB33), and during its respective interval detects whether a receiving wireless signal is present.

Since the SIFS waiting time of the access point 20a is shorter than the (DIFS+random number) waiting times of the wireless terminals 10bA and 10bB, the waiting time of the access point 20a finishes first. At this point, it is supposed that the access point 20a has transmission data, and for example transmits a Data3 signal addressed to the wireless terminal 10bB (A27).

The wireless terminal 10bB, upon receiving a valid Data3 signal (TB34), waits an SIFS interval (TB35), and subsequently transmits an ACK signal to the access point 20a (TB36). At this point, if the "more fragments" flag in the MAC header of the Data3 signal is reset, the "more fragments" flag in the MAC header of the responding ACK signal will also be reset. In the case where the "more fragments" flag is reset and further transmission data is present, the wireless terminal 10bB waits a PIFS interval (TB37) immediately after transmitting the ACK signal. If no wireless signals are received during this PIFS interval, the wireless terminal 10bB subsequently transmits a Data4 signal addressed to the access point 20a (TB38).

Meanwhile, the other wireless terminal 10bA, upon receiving an ACK signal from the wireless terminal 10bB (TA36), waits a (DIFS+random number) interval (TA37). In addition, the access point 20a, upon receiving an ACK signal from the wireless terminal 10bB (A28), waits an SIFS interval (A29), and in the case where transmission data is present, transmits this data. As described above, since in this case the waiting time of the access point 20a is shorter than that of either the wireless terminal 10bA or 10bB, this data transmission does not interfere with data transmissions from either the wireless terminal 10bA or 10bB. For the sake of this example, it is supposed at this point that the access point 20a does not have any transmission data, and therefore the wireless terminal 10bB, having the shorter waiting time among the wireless terminals 10bA and 10bB, obtains transmission rights. As described above, the wireless terminal 10bB subsequently transmits a Data4 signal addressed to the wireless terminal 20a (TB38).

The operation of the communication control processing unit 27a of the access point 20a of the third embodiment will now be described. As described above, the access point 20a of the present embodiment is identical to the access point 20a of the second embodiment. Consequently, the operation of the communication control processing unit 27a of the access point 20a of the third embodiment is the same as the operation of the communication control processing unit 27a of the access point 20a of the second embodiment.

Figure 11:
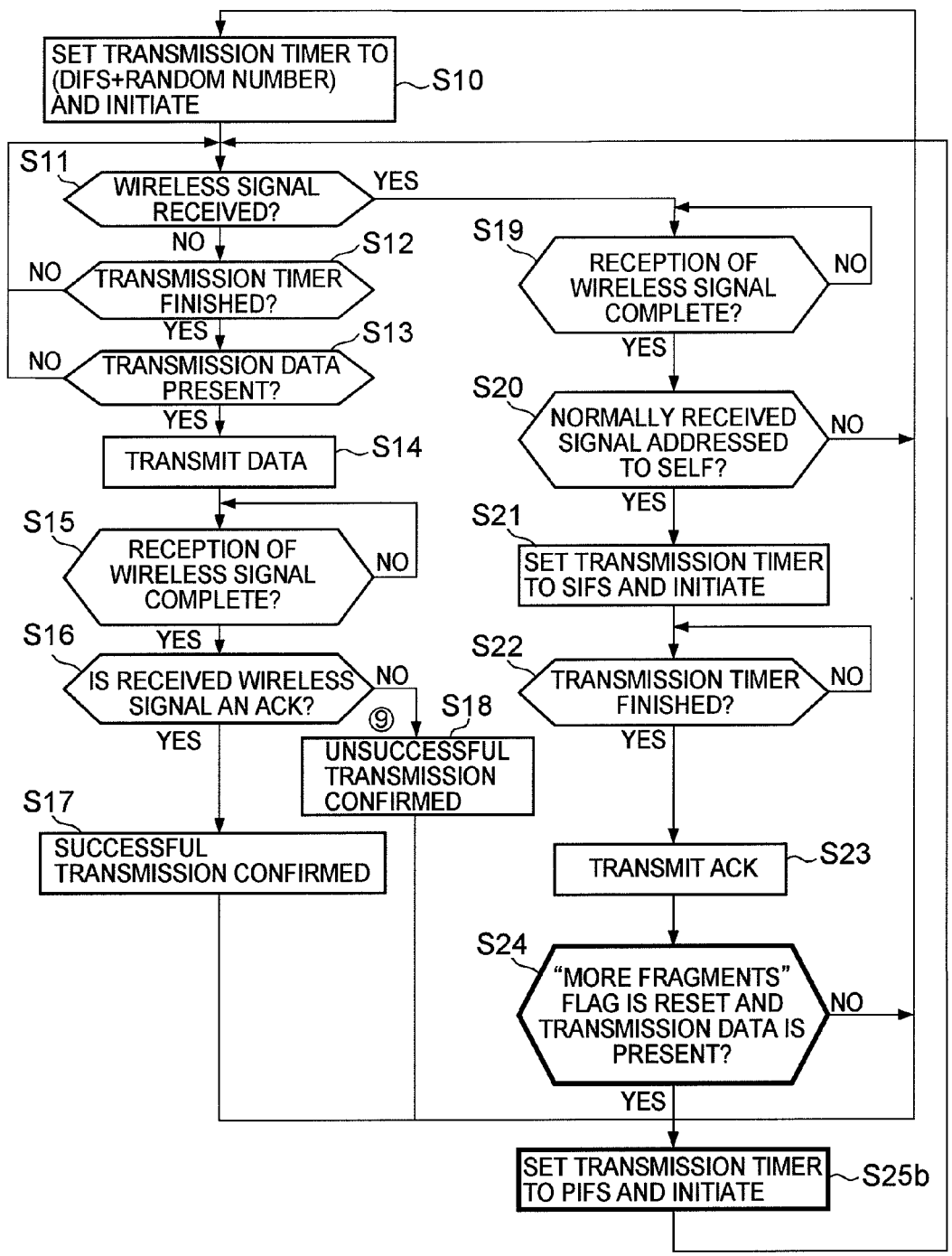
FIG. 11 is a flowchart showing the operation of the communication control processing unit of a wireless terminal in accordance with the third embodiment of the present invention.

The operation of the communication control processing unit 19b of the wireless terminals 10b of the third embodiment will now be described with reference to the flowchart shown in FIG. 11.

The operation of the communication control processing unit 19b of the wireless terminals 10b of the present embodiment is fundamentally equivalent to that of a conventional wireless terminal. However, after causing an ACK signal to be transmitted from the antenna 11 in step 23, the communication control processing unit 19b, unlike the conventional wireless terminals, determines whether or not the "more fragments" flag in the MAC header of this ACK signal is reset, as well as whether or not transmission data is present (S24). In the case where either the "more fragments" flag is not reset, or transmission data is not present, the process returns to step S10 in the same manner as in the conventional wireless terminals. However, in the case where the "more fragments" flag is reset, and transmission data is present, the communication control processing unit 19b sets the transmission timer to a value equal to the PIFS interval, and after subsequently initiating this transmission timer (S25b, TA33, TB37), the process returns to step S11. As described with reference to FIG. 10, at this point the other wireless terminal has been in a queuing status over the interval (DIFS+random number) (TB31, TA37) from the point when the ACK signal transmitted in step S23 (TA32, TB36) was received. For this reason, the present one of the wireless terminals 10b does not receive a wireless signal from the other wireless terminal (this is also true for the case wherein conventional wireless terminals are included), and therefore the present one of the wireless terminals 10b is able to transmit data from the antenna 11 (S14, TA31, TB38) via the process described in steps S11, S12, and S13. However, the above does not hold true in the case where the present one of the wireless terminals 10b receives a wireless signal from the access point 20a in step S11.

As described above, in the present embodiment, even if general-purpose conventional wireless terminals coexist with the wireless terminals 10b in accordance with the present embodiment, signal interference does not occur as in the second embodiment. Furthermore, in the present embodiment, since the waiting time of the wireless terminals 10b after transmitting an ACK signal and before transmitting a data signal is the PIFS, which is shorter than the DIFS of the second embodiment, transmission efficiency can be further enhanced over that of the second embodiment.

Fourth Embodiment

A wireless communication system in accordance with the fourth embodiment of the present invention will now be described.

For an access point 20c of the wireless communication system in accordance with the present embodiment, the PIFS, being longer than the SIFS of the access point 20a in accordance with second and third embodiments, and shorter than the DIFS, is employed as the waiting time after receiving an ACK signal.

In this case, in order to avoid interference with transmissions from the access point 20c, the wireless terminals in this system may be subjected to the following conditions: the waiting time for priority wireless terminals is set to SIFS, and the waiting time for all other wireless terminals is set to (DIFS+random number).

In this case, since the SIFS waiting time of the priority wireless terminals is shorter than the PIFS waiting time of the access point 20c, transmission of signals in series by the access point 20c is prevented. Furthermore, since the (DIFS+random number) waiting time of all other wireless terminals is equivalent to the waiting time of the general-purpose conventional wireless terminals, signal interference does not occur between general purpose conventional wireless terminals and the priority terminals or the access point 20c.

As described above, it is herein supposed that the wireless terminals of the present embodiment take the SIFS interval as the waiting time upon transmitting an ACK signal, and furthermore take the (DIFS+random number) interval as the waiting time upon receiving an ACK signal from another device. In other words, the wireless terminals of the present embodiment are identical to the wireless terminals 10 in accordance with the first embodiment.

Figure 12:
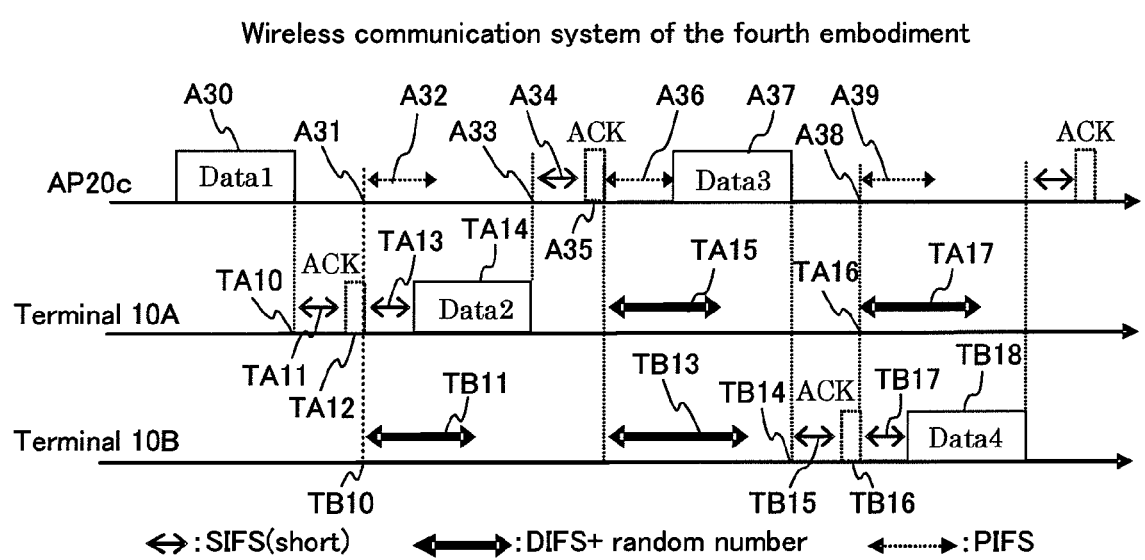
FIG. 12 is a timing chart showing the operation of a wireless communication system in accordance with a fourth embodiment of the present invention.

FIG. 12 is a timing chart showing the operation of the wireless communication system in accordance with the fourth embodiment of the present invention.

First, an access point 20c transmits a Data1 signal addressed to the wireless terminal 10A (A30). The Data1 signal referred to herein is taken to be a single IP packet, or alternatively the last fragmented IP packet.

If the wireless terminal 10A normally receives a Data1 signal from the access point 20c (TA10), and furthermore if the "more fragments" flag in this signal is reset, the wireless terminal 10A waits an SIFS interval (TA11), and subsequently returns an ACK signal addressed to the access point 20c wherein the "more fragments" flag is reset (TA12). At this point, if the wireless terminal 10A has transmission data, the wireless terminal 10A waits an SIFS interval (TA13) immediately after transmitting the ACK signal. If during this interval the wireless terminal 10A receives no receiving signal from another device, the wireless terminal 10A subsequently transmits a Data2 signal addressed to the access point 20c (TA14).

Meanwhile, the other wireless terminal 10B, upon receiving an ACK signal from the wireless terminal 10A (TB10), waits a (DIFS+random number) interval in accordance with the IEEE 802.11 standard (TB11). In addition, the access point 20c, upon receiving an ACK signal from the wireless terminal 10A (A31), waits a PIFS interval (A32). For this reason, among the plurality of devices, the wireless terminal 10A is certain to obtain priority to transmit the wireless signal.

The access point 20c, upon receiving a valid Data2 signal from the wireless terminal 10A (A33), waits an SIFS interval (A34), subsequently transmits an ACK signal notifying the wireless terminal 10A that a Data2 signal was normally received (A35), and subsequently waits a PIFS interval (A36). Once this ACK signal is transmitted, each wireless terminal 10A and 10B respectively waits a (DIFS+random number) interval (TA15, TB13), and during this interval detects whether a receiving wireless signal is present.

Since the PIFS waiting time of the access point 20c is shorter than the (DIFS+random number) interval of either the wireless terminal 10A or 10B, the waiting time of the access point 20c finishes first. At this point, it is supposed that the access point 20c has transmission data, and for example transmits a Data3 signal addressed to the wireless terminal 10B (A37).

The wireless terminal 10B, upon receiving a valid Data3 signal (TB14), waits an SIFS interval (TB15), and subsequently transmits an ACK signal to the access point 20c (TB16). At this point, if the "more fragments" flag in the MAC header of the Data3 signal is reset, then the "more fragments" flag in the MAC header of the responding ACK signal will also be reset. In the case where the "more fragments" flag is reset and the wireless terminal 10B has transmission data, the wireless terminal 10B waits an SIFS interval (TB17) immediately after transmitting the ACK signal, and subsequently transmits a Data4 signal addressed to the access point 20c (TB18).

Meanwhile, the other wireless terminal 10A, upon receiving an ACK signal from the wireless terminal 10B (TA16), waits a (DIFS+random number) interval (TA17). In addition, the access point 20c, upon receiving an ACK signal from the wireless terminal 10B (A38), waits a PIFS interval (A39). If during this interval the access point 20c does not receive a receiving wireless signal, and in addition has transmission data itself, the access point 20c will subsequently transmit this data. However, in the case of the present example, the wireless terminal 10B, having transmission data, has the shortest waiting time, thereby obtaining transmission rights and, as described above, subsequently transmits a Data4 signal addressed to the access point 20c (TB18).

Figure 13:
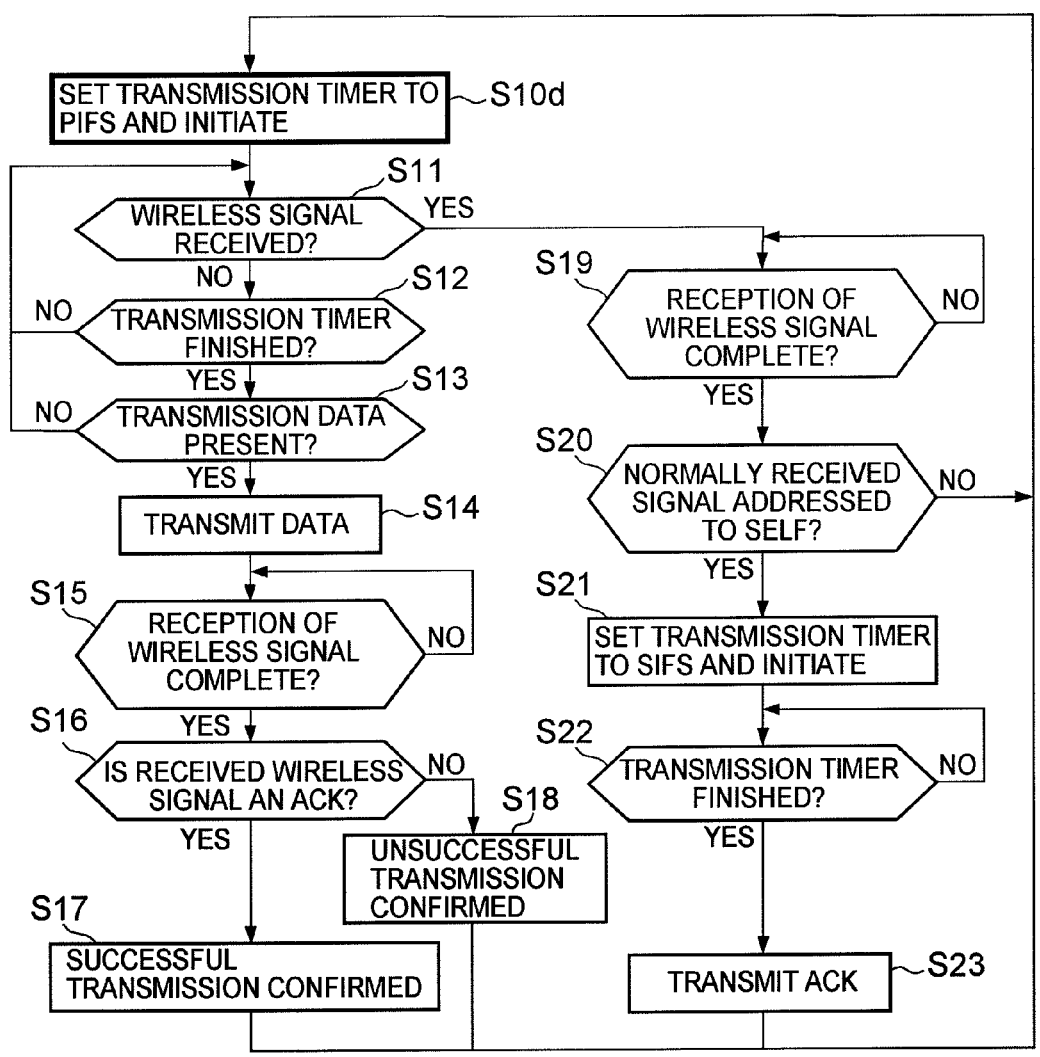
FIG. 13 is a flowchart showing the operation of the communication control processing unit of an access point in accordance with the fourth embodiment of the present invention.

The operation of the communication control processing unit 27c of the access point 20c in accordance with the fourth embodiment will now be described with reference to the flowchart shown in FIG. 13.

As described above, the waiting time of the access point 20c in accordance with the present embodiment is the PIFS interval after receiving an ACK signal as well as after transmitting an ACK signal. For this reason, among the operational steps of the access point employing the conventional DCF method as described with reference to FIG. 5, the step S10 wherein a transmission timer is set to a value equal to (DIFS+random number) is changed to a step S10d wherein the transmission timer is set to a value equal to PIFS. All operational steps other than this step S10d are identical to the operational steps of an access point employing the conventional DCF method.

The operation of the communication control processing unit 19 of the wireless terminals 10 in accordance with the fourth embodiment will now be described.

The wireless terminals 10 in accordance with the present embodiment are identical to the wireless terminals 10 of the first embodiment. Consequently, the operation of the communication control processing unit 19 of the wireless terminals 10 in accordance with the present embodiment is identical to the operation of the communication control processing unit 19 of the wireless terminals 10 of the first embodiment as shown in FIG. 6.

As described above, in the present embodiment, even if conventional wireless terminals coexist with the wireless terminals 10 of the present embodiment, the waiting time of the wireless terminals 10 after transmitting an ACK signal is the SIFS, as in the first embodiment. For this reason, signal interference does not occur as in the second embodiment. Moreover, the access point 20c of the present embodiment is a PIFS wherein a waiting time after receiving an ACK signal as well as after transmitting an ACK signal is shorter than the DIFS. Furthermore, as described above, the wireless terminals 10 of the present embodiment is an SIFS wherein a waiting time after transmitting an ACK signal is shorter than either the DIFS or the PIFS. For these reasons, transmission efficiency can be further enhanced over the first embodiment as well as the second embodiment.

Fifth Embodiment

The fifth embodiment of the wireless communication system in accordance with the present invention will now be described.

The wireless terminals 10 of the present embodiment are identical to the wireless terminals of the first embodiment. In addition, the operation of the communication control processing unit 27d of the access point 20d of the present embodiment is fundamentally equivalent to the operation of the communication control processing unit 19 of the wireless terminals in accordance with the first embodiment. In other words, in the present embodiment, the wireless terminals 10 and the access point 20d operate fundamentally in accordance with the IEEE 802.11 standard, except that the respective waiting times of these devices after transmitting an ACK signal is the SIFS.

Figure 14:
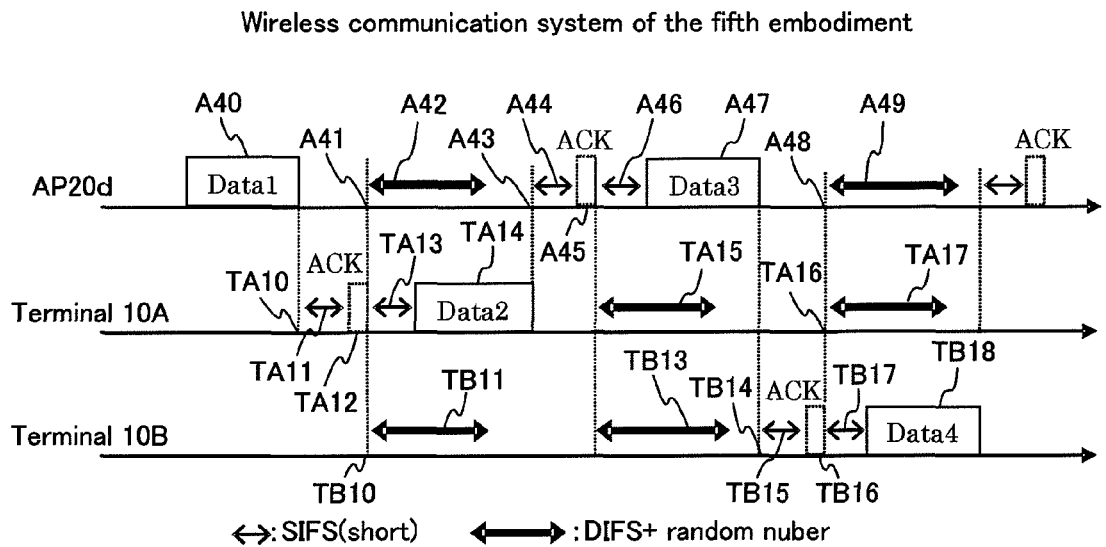
FIG. 14 is a timing chart showing the operation of a wireless communication system in accordance with a fifth embodiment of the present invention.

FIG. 14 is a timing chart showing the operation of the wireless communication system in accordance with the fifth embodiment of the present invention.

First, the access point 20d transmits a Data1 signal addressed to the wireless terminal 10A (A40). The Data1 signal referred to herein is taken to be an IP packet, or alternatively the last fragmented IP packet.

If the wireless terminal 10A normally receives a Data1 signal from the access point 20d (TA10), and furthermore the "more fragments" flag in this signal is reset, the wireless terminal 10A waits an SIFS (TA11), and subsequently returns an ACK signal addressed to the access point 20d wherein the "more fragments" flag is reset (TA12). At this point, if the wireless terminal 10A has transmission data, the wireless terminal 10A waits an SIFS interval (TA13) immediately after transmitting the ACK signal. If during this interval the wireless terminal 10A receives no receiving signal from another device, the wireless terminal 10A subsequently transmits a Data2 signal addressed to the access point 20d (TA14).

Meanwhile, the other wireless terminal 10B as well as the access point 20d, respectively, upon receiving an ACK signal from the wireless terminal 10A (TB10, A41), wait a (DIFS+random number) interval in accordance with the IEEE 802.11 standard (TB11, A42). For this reason, among the plurality of devices on the wireless LAN, the wireless terminal 10A is certain to obtain priority transmission rights to transmit the next wireless signal.

The access point 20d, upon receiving a valid Data2 signal from the wireless terminal 10A (A43), waits an SIFS interval (A44), subsequently transmits an ACK signal notifying the wireless terminal 10A that a Data2 signal was normally received (A45), and subsequently waits an SIFS interval (A46). Once this ACK signal is transmitted, each wireless terminal 10A and 10B respectively waits a (DIFS+random number) interval in accordance with the IEEE 802.11 standard (TA15, TB13), and during this interval detects whether or not a receiving wireless signal is present.

Since the SIFS waiting time of the access point 20d is shorter than the (DIFS+random number) waiting time of the wireless terminals 10A and 10B, the waiting time of the access point 20d finishes first. At this point, it is supposed that the access point 20d has transmission data, and for example transmits a Data3 signal addressed to the wireless terminal 10B (A47).

The wireless terminal 10B, upon receiving a valid Data3 signal (TB14), waits an SIFS interval (TB15), and subsequently transmits an ACK signal to the access point 20d (TB16). At this point, if the "more fragments" flag in the MAC header of the Data3 signal is reset, then the "more fragments" flag in the MAC header of the responding ACK signal will also be reset. In the case where the "more fragments" flag is reset and the wireless terminal 10B has transmission data, the wireless terminal 10B waits an SIFS interval (TB17) immediately after transmitting the ACK signal, and subsequently transmits a Data4 signal addressed to the access point 20d (TB18).

Meanwhile, the other wireless terminal 10A as well as the access point 20d, respectively, upon receiving an ACK signal from the wireless terminal 10B (TA16, A48), wait a (DIFS+random number) interval (TA17, A39). In this case, since the waiting time of the wireless terminal 10B is the shortest, the wireless terminal 10B obtains transmission rights, and subsequently transmits the Data4 signal addressed to the access point 20d (TB18).

As described above, the operation of both the communication control processing unit 19 of the wireless terminals 10 and the communication control processing unit 27d of the access point 20d in accordance with the fifth embodiment is identical to the operation of the communication control processing unit 19 of the wireless terminals 10 in accordance with the first embodiment as described with reference to FIG. 6.

As described above, in the present embodiment, even if conventional wireless terminals coexist with the wireless terminals 10 of the present embodiment, the waiting time of the wireless terminals 10 after transmitting an ACK signal is the SIFS interval, as in the first embodiment. For this reason, signal interference does not occur as in the second embodiment. Moreover, with regard to the access point 20d and the wireless terminals 10 in accordance with the present embodiment, the waiting time after transmitting an ACK signal the SIFS, which is shorter than the DIFS or the PIFS. For this reason, transmission efficiency can be further enhanced over the other foregoing embodiments.

Sixth Embodiment

A wireless communication system in accordance with the sixth embodiment of the present invention will now be described.

In order to further improve the transmission efficiency of the wireless communication system in accordance with the foregoing fifth embodiment, in the present embodiment the ACK signal transmission time, and the preceding/following SIFS interval thereof, is reduced.

Specifically, the wireless terminals 10e as well as the access point 20e of the present embodiment fundamentally operate as follows:

a) Data is transmitted after an SIFS interval in lieu of a responding ACK signal when transmission data is present and data was properly received.

b) A responding ACK signal is transmitted in accordance with the IEEE 802.11 standard when transmission data is not present and data was properly received.

c) Neither an ACK signal nor transmission data is transmitted when data was not properly received.

Figure 15:
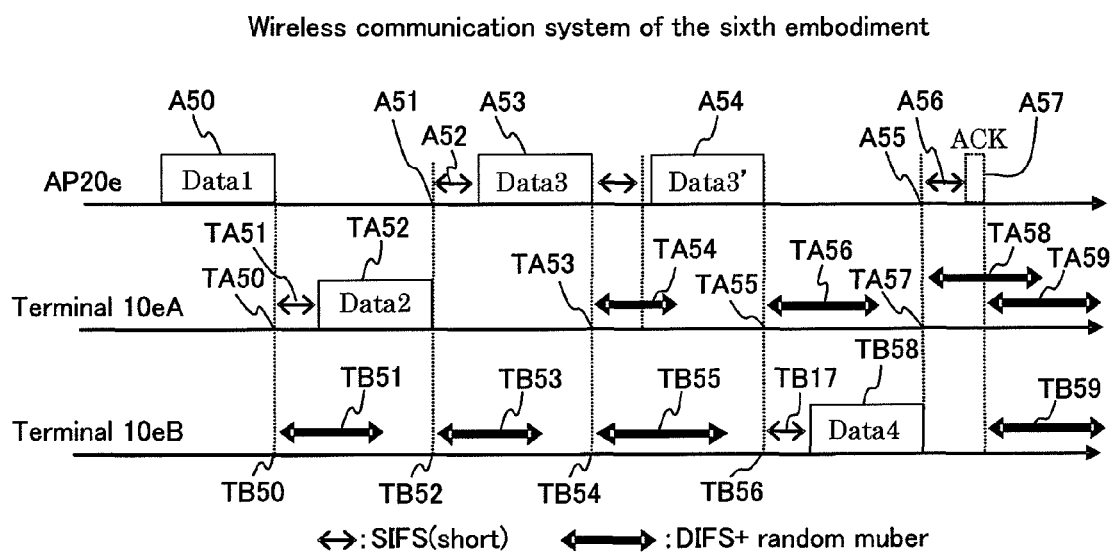
FIG. 15 is a timing chart showing the operation of a wireless communication system in accordance with a sixth embodiment of the present invention.

FIG. 15 is a timing chart showing the operation of the wireless communication system in accordance with the sixth embodiment.

First, the access point 20e transmits a Data1 signal addressed to the wireless terminal 10eA (A50). The Data1 signal referred to herein is taken to be a single IP packet, or alternatively the last fragmented IP packet. In this case, according to the IEEE 802.11 standard, the "more fragments" flag, included in the MAC header of a packet is reset.

If the wireless terminal 10eA normally receives a Data1 signal from the access point 20e (TA50), and in addition the "more fragments" flag of this signal is reset, the wireless terminal 10eA waits an SIFS interval (TA51). Since the access point 20e is waiting for either an ACK signal or a data signal, the access point 20e will not transmit another data signal at this time. In addition, since the other wireless terminal 10eB receives the Data1 signal which was not addressed to the wireless terminal 10eB itself (TB50), the wireless terminal 10eB, upon the completion of receiving this Data1 signal, waits a (DIFS+random number) interval (TB51). Consequently, the wireless terminal 10eA, upon the completion of receiving this Data1 signal, waits an SIFS interval, and subsequently obtains transmission rights. In the case where transmission data is present, the wireless terminal 10eA transmits a data signal addressed to the access point 20e in lieu of an ACK signal. In the case where transmission data is not present, the wireless terminal 10eA transmits an ACK signal addressed to the access point 20e. At this point t, the wireless terminal 10eA transmission data transmits a Data2 signal addressed to the access point 20e (TA52).

The access point 20e, upon receiving a valid Data2 signal (A51), waits an SIFS interval (A52). Since the wireless terminal 10eA is waiting to receive either an ACK signal or a data signal in response to the Data2 signal, the wireless terminal 10eA will not transmit another data signal at this time. In addition, when the other wireless terminal 10eB receives the Data2 signal which was not addressed to itself (TB52), upon the completion of receiving this Data2 signal, it waits a (DIFS+random number) interval (TB53). Consequently, the access point 20e, upon the completion of receiving this Data2 signal, waits an SIFS interval, and subsequently obtains transmission rights. In the case where transmission data is present, the access point 20e transmits a data signal addressed to either of the wireless terminals 10eA or 10eB in lieu of an ACK signal. In the case where transmission data is not present, the access point 20e transmits an ACK signal addressed to the wireless terminal 10eA. For the purposes of this example, at this point the access point 20e, having transmission data, transmits a Data3 signal addressed to the wireless terminal 10eB (A53).

In the case where the wireless terminal 10eB, although receiving a Data3 signal transmitted by the access point 20e (TB54), does not receive a valid signal, the wireless terminal 10eB waits a (DIFS+random number) interval (TB55) without transmitting either an ACK signal or a data signal. In addition, the wireless terminal 10eA, upon receiving the Data3 signal which was not addressed to itself (TA53), waits a (DIFS+random number) interval (TA54). For this reason, since the access point 20e does not receive an ACK signal or a data signal from either of the wireless terminals 10eA or 10eB, the access point 20e retransmits the Data3 signal (Data3') addressed to the wireless terminal 10eB (A54).

If the wireless terminal 10eB normally receives the Data3' signal from the access point 20e (TB56), and in addition the "more fragments" flag of this signal is reset, the wireless terminal 10eB waits an SIFS interval (TB57). Since the access point 20e is waiting for an ACK signal or a data signal, the access point 20e will not transmit a data signal at this time. In addition, since the other wireless terminal 10eA receives the Data3' signal which was not addressed to itself (TA55), upon completion of receiving this Data3' signal, the wireless terminal 10eA waits a (DIFS+random number) interval (TA56). Consequently, the wireless terminal 10eB, upon completion of receiving the Data3' signal, waits an SIFS interval, and subsequently obtains transmission rights. In the case where transmission data is present, the wireless terminal 10eB transmits a data signal addressed to the access point 20e in lieu of an ACK signal. In the case where transmission data is not present, the wireless terminal 10eB transmits an ACK signal addressed to the access point 20e. For the purposes of this example, at this point the wireless terminal 10eB, having transmission data, transmits a Data4 signal addressed to the access point 20e (TA58).

The access point 20e, upon receiving a valid Data4 signal (A55), waits an SIFS interval (A56). Since the wireless terminal 10eB is waiting to receive an ACK signal or a data signal in response to the Data4 signal, the wireless terminal 10eB will not transmit a data signal at this time. In addition, when the other wireless terminal 10eA receives the Data4 signal which was not addressed to itself (TA57), upon completion of receiving this Data4 signal, waits a (DIFS+random number) interval (TA58). Consequently, the access point 20e, upon completion of receiving this Data4 signal, waits an SIFS interval, and subsequently obtains transmission rights. In the case where transmission data is present, the access point 20e transmits a data signal addressed to either of the wireless terminals 10eA or 10eB in lieu of an ACK signal. In the case where transmission data is not present, the access point 20e transmits an ACK signal addressed to the wireless terminal 10eB. For the purposes of this example, at this point the access point 20e, having no transmission data, transmits an ACK signal addressed to the wireless terminal 10eB (A57).

The wireless terminals 10eA and 10eB, respectively, having no further transmission data to be transmitted to the access point 20e, upon receiving an ACK signal from the access point 20e, determine that priority transmission rights are unnecessary, and wait a (DIFS+random number) interval (TA59, TB59). Whichever wireless terminal finishes its waiting time first without receiving a receiving wireless signal will obtain transmission rights for the next signal.

Figure 16:
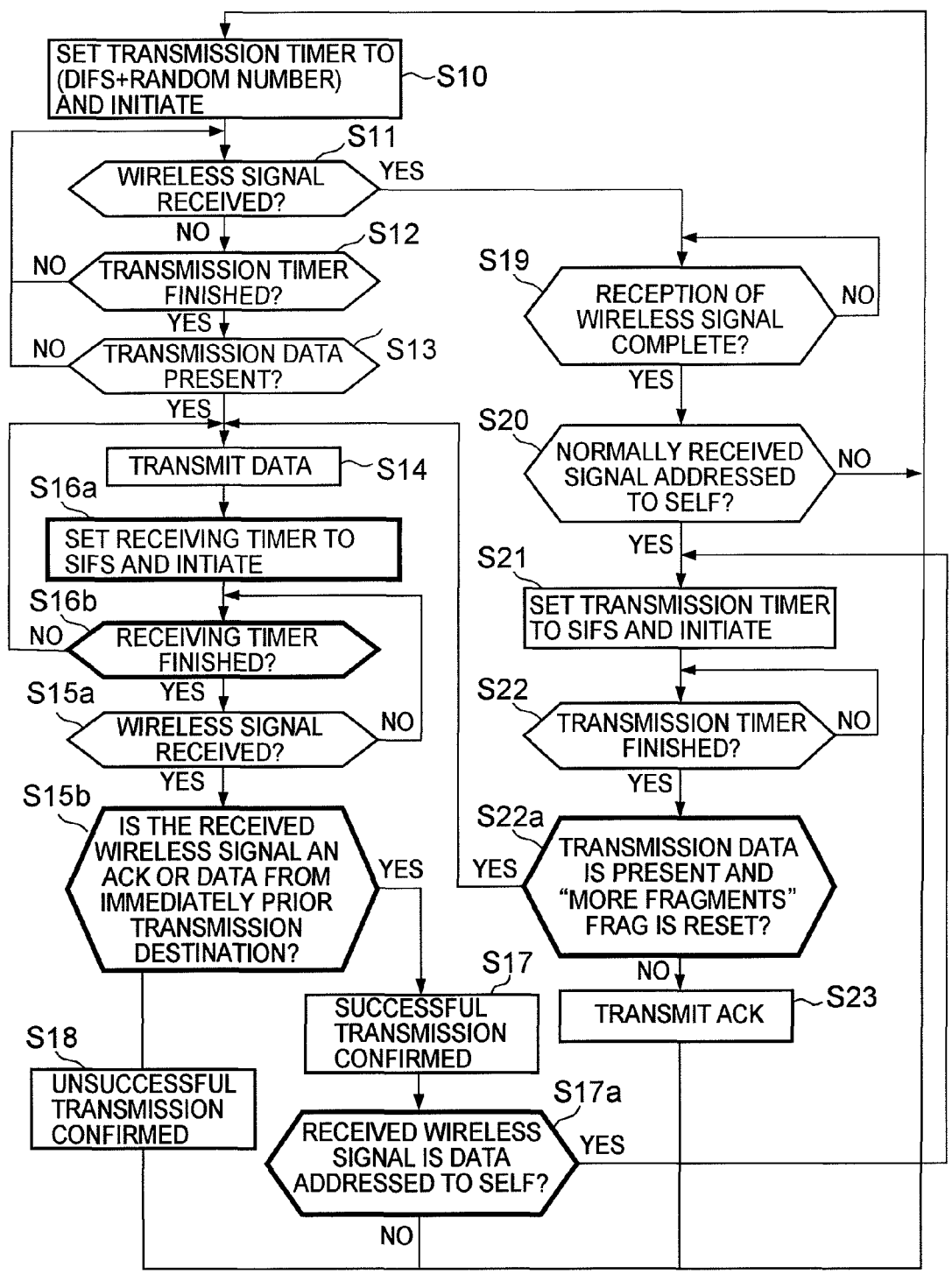
FIG. 16 is a flowchart showing the operation of the communication control processing unit of a wireless terminal as well as an access point in accordance with the sixth embodiment of the present invention.

The operation of both the communication control processing unit 19e of the wireless terminals 10e as well as the communication control processing unit 27e of the access point 20e in accordance with the sixth embodiment will now be described with reference to the flowchart shown in FIG. 16. It should be appreciated that, in the present embodiment, the communication control processing unit 19e of the wireless terminals 10e and the communication control processing unit 27e of the access point 20e operate identically.

For some operations, the communication control processing unit 19e of the wireless terminals 10e, as well as the communication control processing unit 27e of the access point 20e, operates in a manner equivalent to the communication control processing unit 27 of the access point 20 employing the conventional DCF method as described with reference to FIG. 5. Specifically, these communication control processing units conduct the processing steps of setting a transmission timer to a value equal to (DIFS+random number) (S10); determining whether a receiving wireless signal is present (S11); determining whether the transmission timer has finished (S12); determining whether transmission data is present (S13); and transmitting data (S14).

The communication control processing units 19e and 27e, upon transmitting a data signal (S14), set a receiving timer to a value equal to SIFS, and initiate this timer (S16a). Subsequently, it is determined whether or not the receiving timer has finished (S16b). If the receiving timer has not finished, it is determined whether or not a receiving wireless signal is being received (S15a). If a receiving wireless signal is not being received, the process returns to step S16b. If the receiving timer finishes before a wireless signal is received, the communication control processing unit determines that the transmission was unsuccessful. In order to retransmit the data, the process returns to step S14 (A54). If a wireless signal is received before the receiving timer finishes, the communication control processing unit determines if this wireless signal is an ACK signal, or alternatively a data signal originating from the immediately prior transmission destination (S15b). In the case where the receiving wireless signal is neither an ACK signal nor a data signal originating from the immediately prior transmission destination, the communication control processing unit determines that the transmission was unsuccessful (S18), and the process returns to step S10. Furthermore, in the case where the receiving wireless signal is either an ACK signal or a data signal originating from the immediately prior transmission destination, the communication control processing unit determines that the transmission was successful (S17). Subsequently, it is determined whether or not this receiving wireless signal is a data signal addressed to the device itself (S17a). If the signal is a data signal addressed to the device itself, the process proceeds to step S21. By contrast, if the signal is not a data signal addressed to the device itself, in other words, if for example the signal is an ACK signal addressed to the device itself, the process returns to step S10.

When the communication control processing units 19e and 27e determine in step S11 that a receiving wireless signal is being received, the communication control processing units respectively conduct the steps of: waiting until the completion of receiving the receiving wireless signal (S19), determining whether or not the signal is addressed to the device itself (S20), setting the transmission timer to a value equal to SIFS (S21), and determining if the transmission timer has finished (S22).

The communication control processing units 19e and 27e, upon determining that the transmission timer has finished, subsequently determine whether or not transmission data is present, and furthermore whether or not the "more fragments" flag in the MAC header of either the wireless signal received in step S11 or the wireless signal received in step S15a is reset (S22a). In the case where transmission data is not present, or alternatively where the "more fragments" flag is not reset, an ACK signal is sent (S23), and the process returns to step S10. However, in the case where transmission data is present, and in addition the "more fragments" flag is reset, a data signal is transmitted immediately without transmitting an ACK signal (S14).

As described above, in the present embodiment, both the wireless terminals 10e and the access point 20e, when receiving a data signal from another device in the case where transmission data is also present, wait an SIFS interval, and subsequently transmit the transmission data signal immediately, without transmitting an ACK signal. As a result, among the embodiments described in the foregoing, the present embodiment has the highest transmission efficiency. However, in the present embodiment, by omitting ACK signal transmission, data transmission is executed extremely quickly. As a result, in the case where conventional wireless terminals coexist, these conventional wireless terminals lose almost all opportunity to transmit signals. In practical terms, the present embodiment is not suited for cases wherein conventional wireless terminals coexist.

Seventh Embodiment

A wireless communication system in accordance with the seventh embodiment of the present invention will now be described.

The access point of the present embodiment causes any one of the plurality of wireless terminals to obtain priority transmission rights and transmit a wireless signal just as the access point of patent document 1, which was cited in the description of the related art. In addition, the wireless terminals 10f of the present embodiment are identical to the wireless terminal employing the conventional DCF method as described with reference to FIG. 5.

Figure 17:
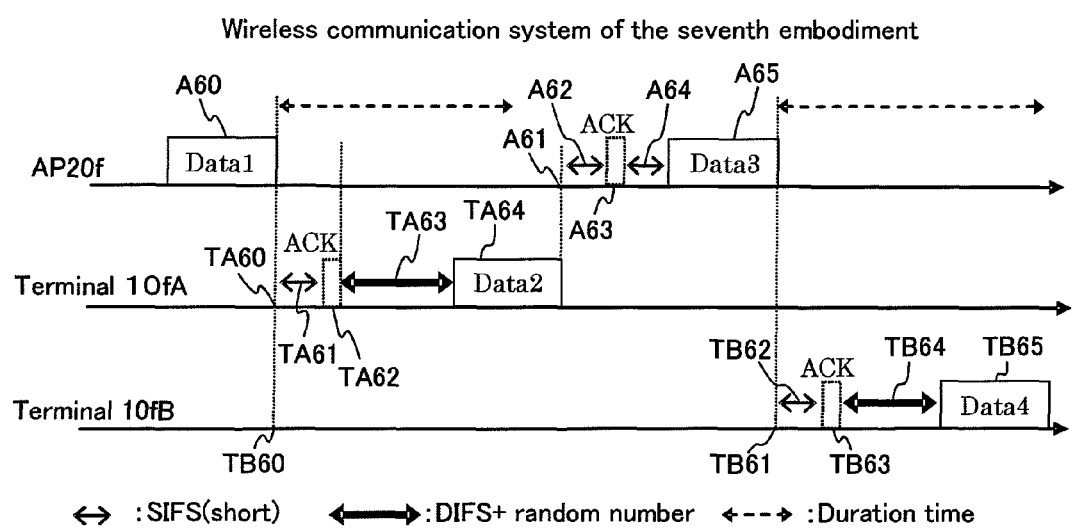
FIG. 17 is a timing chart showing the operation of a wireless communication system in accordance with a seventh embodiment of the present invention.

FIG. 17 is a timing chart showing the operation of the wireless communication system in accordance with the seventh embodiment of the present invention.

First, it is supposed that the access point 20f transmits a Data1 signal addressed to the wireless terminal 10fA (A60). The Data1 signal referred to herein is taken to be an IP packet or the last fragmented IP packet. At this time, in the case where the access point 20f will subsequently cause the wireless terminal 10fA to obtain priority transmission rights and transmit a wireless signal, the access point 20f configures a long duration time, and includes this duration time information in the above-described Data1 signal. The cases wherein it is desirable for the access point 20f to cause the wireless terminal 10fA to obtain priority transmission rights and transmit a wireless signal in this way may include, for example, the case wherein sound signals are transmitted as data in 20 ms periods, and the case wherein sound signals are not received from the wireless terminal A for a closest duration (20−α) ms (α is a predetermined constant) and other cases.

The wireless terminal 10fA, upon receiving a valid Data1 signal from the access point 20f (TA60), waits an SIFS interval (TA61), and subsequently transmits an ACK signal addressed to the access point 20f (TA62).

In accordance with the IEEE 802.11 standard, the above-described duration time included in the Data1 signal is not applied to the wireless terminal 10fA of the transmission destination, but instead is only applied to the other wireless terminal 10fB. Consequently, as a result of this long duration time, the wireless terminal 10fB (excluding the wireless terminal 10fA) will not transmit a wireless signal until this duration interval finishes. As a result, if the access point 20f also does not transmit a wireless signal at this time, only the wireless terminal 10fA will have transmission rights. This duration time specified by the access point 20f is reliably longer than the time from the point when the access point 20f transmits a data signal to the wireless terminal to obtain priority transmission rights, and until the point when the wireless terminal, having obtained priority transmission rights, begins transmitting its data signal. Specifically, this duration time is configured to be a value equal to [SIFS+ACK signal transmission time+(DIFS+maximum random number)].

The wireless terminal 10fA, after transmitting the above-described ACK signal (TA62), subsequently waits a (DIFS+random number) interval (TA63), in accordance with the IEEE 802.11 standard. During this interval, if no wireless signal is received from another device, the wireless terminal 10fA subsequently transmits a Data2 signal (TA64).

The access point 20f, upon receiving a valid Data2 signal (A61), waits an SIFS interval (A62), and transmits an ACK signal (A63). Subsequently, as part of the characteristic operation of the present embodiment, if transmission data is present, the access point 20f waits an SIFS interval (A64), and for example transmits a Data3 signal addressed to the wireless terminal 10fB (A65). At this point, as part of the characteristic operation of the present embodiment, in the case where it is desirable for the access point 20f to elicit a wireless signal from the wireless terminal 10fB, the access point 20f specifies a long duration time, and includes this duration time information in the Data3 signal. Even if the duration time included in the Data1 signal may have, for example, specified an interval from the point when the Data1 signal was transmitted until a point during the transmission of the ACK signal at A63, or even until a point during the transmission of the Data3 signal at A65 caused by the smallness of this random number of the waiting time (DIFS+random number) of the wireless terminal 10fA at TA63, the access point 20f will still execute the transmission of the ACK signal at A63 and the transmission of the Data3 signal at A65.

The wireless terminal 10fB, upon receiving a valid Data3 signal, waits an SIFS interval (TB62), and subsequently transmits an ACK signal (TB63). At this point, since the duration time included in the Data3 signal is long, the other wireless terminal 10fA receiving the ACK signal will not transmit a wireless signal until this duration interval finishes. For this reason, the wireless terminal 10fB, after waiting a (DIFS+random number) interval (TB64) in accordance with the IEEE 802.11 standard, reliably obtains transmission rights, and subsequently transmits a Data4 signal addressed to the access point 20f (TB65).

Figure 18:
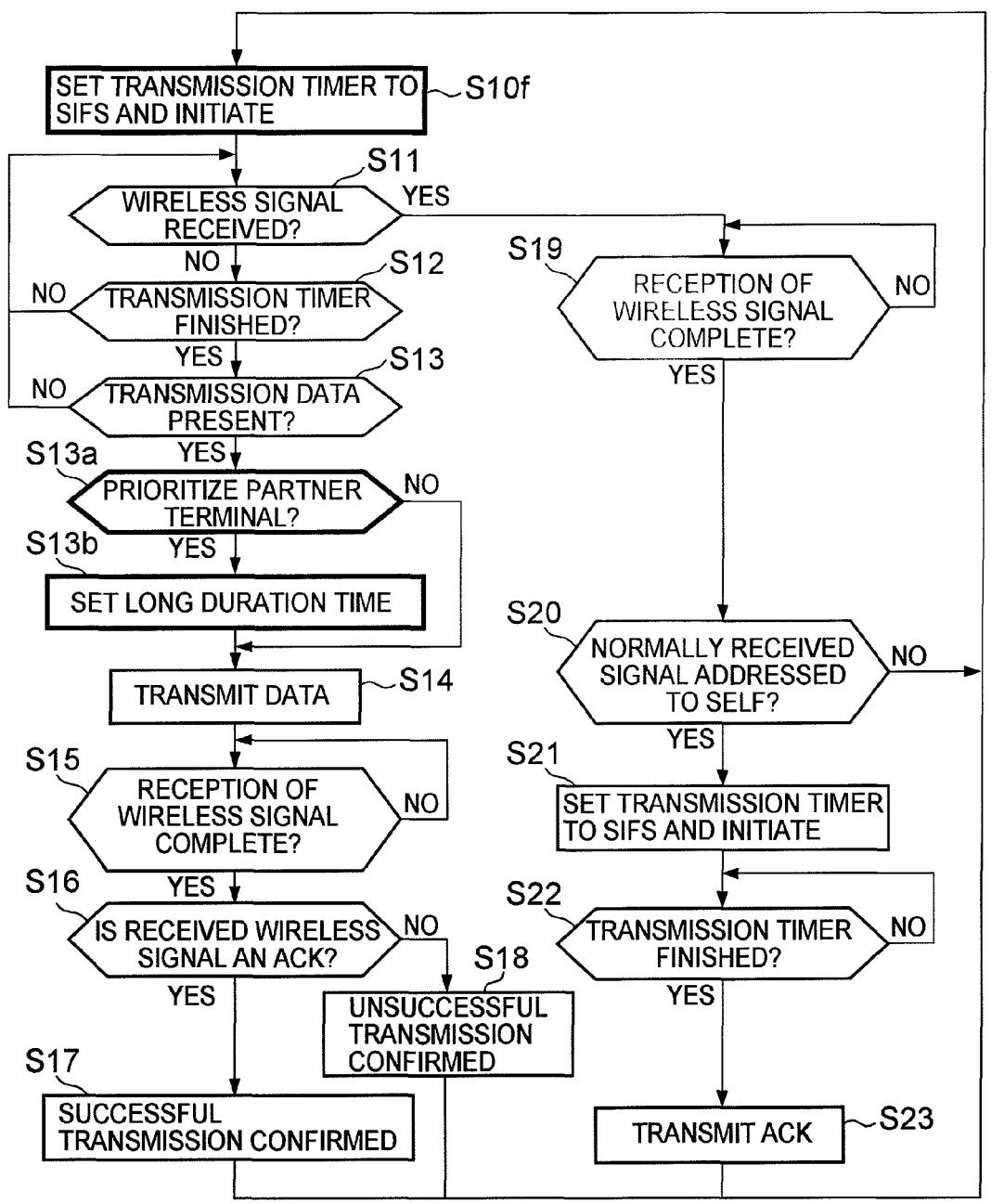
FIG. 18 is a flowchart showing the operation of the communication control processing unit of an access point in accordance with the seventh embodiment of the present invention.

The operation of the communication control processing unit 27f of the access point 20f in accordance with the seventh embodiment will now be described with reference to and following the flowchart shown in FIG. 18.

As described above, the waiting time of the access point 20f in accordance with the present embodiment after receiving an ACK signal and after transmitting an ACK signal is the SIFS interval. For this reason, among the operational steps of the access point employing the DCF method in accordance with the conventional art as described with reference to FIG. 5, the step S10 wherein a transmission timer is set to a value equal to (DIFS+random number) is changed to a step S10f wherein the transmission timer is set to a value equal to SIFS.

After executing this step S10f, the communication control processing unit 27f of the access point 20f, in a manner equivalent to the access point employing the DCF method in accordance with the conventional art, conducts the processing steps of: determining whether a receiving wireless signal is present (S11), determining if the transmission timer has finished (S12), and determining if transmission data is present (S13).

In addition, the communication control processing unit 27f, upon determining that transmission data is present (S13), subsequently determines whether or not the destination terminal of this transmission data should be granted priority transmission rights (S13a). As described above, this determination is conducted by determining whether or not a selected condition, such as whether a wireless signal from the destination terminal has been received recently, has been fulfilled. If it is determined that the destination terminal should be granted priority transmission rights, the communication control processing unit 27f specifies the above-described long duration time (S13b). Furthermore, in the case where this long duration time is specified, this duration time information is stored in an outgoing frame of the transmission data, and this data signal is subsequently transmitted from the antenna (S14). However, in the case where it is determined in step S13a that the destination terminal should not be granted priority transmission rights, the communication control processing unit 27f causes the transmission data to be transmitted from the antenna (S14) immediately, without specifying a long duration time.

Subsequent processing steps of the communication control processing unit 27f, as well as the step S11 wherein it is determined whether or not a receiving wireless signal is present, are identical to the operational steps of the access point employing the DCF method in accordance with the conventional art as described with reference to FIG. 5.

As described above, the operation of the wireless terminal 10f in accordance with the seventh embodiment is identical to that of a wireless terminal employing the DCF method in accordance with the conventional art as described with reference to FIG. 5.

As described above, in the present embodiment, one of the wireless terminals among the plurality of wireless terminals is granted priority transmission rights to transmit a wireless signal, in a similar manner to the technology described in patent document 1. However, by including duration time information in a data signal transmitted to the wireless terminal to be granted priority transmission rights, and thereby suppressing transmission from other wireless terminals, transmission efficiency can be further enhanced over the one described in patent document 1.

What is claimed is:

1. A wireless terminal for wirelessly communicating with an access point via a wireless LAN (Local Area Network), the wireless terminal comprising:

a transmission unit which transmits a wireless signal;
a receiving unit which receives a wireless signal; and
a communication control unit;
wherein, when the receiving unit receives the wireless signal addressed to the terminal itself from the access point, if transmission data is present, in priority to transmission of wireless signals from other wireless terminals connected to the access point, the communication control unit causes the wireless signal including the transmission data to be transmitted from the transmission unit;
wherein after the receiving unit receives the wireless signal addressed to the terminal itself from the access point and the communication control unit causes an ACK signal, notifying the access point that the wireless signal was normally received, to be transmitted from the transmission unit, if the wireless signal is not received during the DIFS (Distributed Coordination Function Inter Frame Space) interval and also where transmission data is present, the communication control unit, after the DIFS interval has passed, causes the wireless signal including the transmission data to be transmitted from the transmission unit; and
wherein, when the receiving unit receives an ACK signal transmitted by another wireless terminal, if the wireless signal is not received during the (DIFS+random number+$\alpha$($\alpha$>0)) interval and also transmission data is present, the communication control unit, after the (DIFS+random number+$\alpha$) interval has passed, causes the wireless signal including the transmission data to be transmitted from the transmission unit.

2. A wireless terminal for wirelessly communicating with an access point via a wireless LAN (Local Area Network), the wireless terminal comprising:

a transmission unit which transmits a wireless signal;
a receiving unit which receives a wireless signal; and
a communication control unit;
wherein, when the receiving unit receives the wireless signal addressed to the terminal itself from the access point, if transmission data is present, in priority to transmission of wireless signals from other wireless terminals connected to the access point, the communication control unit causes the wireless signal including the transmission data to be transmitted from the transmission unit;
wherein, after the receiving unit receives the wireless signal addressed to the terminal itself from the access point and the communication control unit causes an ACK signal, notifying the access point that the wireless signal was normally received, to be transmitted from the transmission unit, if the wireless signal is not received during the PIFS (Point Coordination Function Inter Frame Space) interval and also where transmission data is present, the communication control unit, after the PIFS interval has passed, causes the wireless signal including the transmission data to be transmitted from the transmission unit; and
wherein, when the receiving unit receives an ACK signal transmitted by another wireless terminal, if the wireless signal is not received during the (DIFS+random number) interval and also transmission data is present, the communication control unit, after the (DIFS+random number) has passed, causes the wireless signal including the transmission data to be transmitted from the transmission unit.

* * * * *